US011976813B2

(12) United States Patent
Loomis et al.

(10) Patent No.: US 11,976,813 B2
(45) Date of Patent: May 7, 2024

(54) WATER-RESISTANT WIRED ELECTRO-MAGNETIC COMPONENT CAPTURE

(71) Applicant: Seasons 4, Inc., Toano, VA (US)

(72) Inventors: Jason Loomis, Decatur, GA (US); Nash Rittmann, Odessa, FL (US); Yi Xin Long, Jiangmen (CN)

(73) Assignee: Seasons 4, Inc., Toano, VA (US)

( * ) Notice: Subject to any disclaimer, the term of this patent is extended or adjusted under 35 U.S.C. 154(b) by 0 days.

(21) Appl. No.: 17/933,041

(22) Filed: Sep. 16, 2022

(65) Prior Publication Data

US 2023/0007978 A1 Jan. 12, 2023

Related U.S. Application Data

(63) Continuation-in-part of application No. 17/450,006, filed on Oct. 5, 2021, now Pat. No. 11,493,198, which is a continuation-in-part of application No. 17/301,850, filed on Apr. 15, 2021, now Pat. No. 11,454,385, which is a continuation of application No. 16/829,937, filed on Mar. 25, 2020, now Pat. No. 11,015,798, which is a continuation of application No. 16/659,302, filed on Oct. 21, 2019, now Pat. No. 11,009,225, which is a continuation of application (Continued)

(51) Int. Cl.

| | |
|---|---|
| ***F21V 31/00*** | (2006.01) |
| ***F21S 4/10*** | (2016.01) |
| ***F21V 3/02*** | (2006.01) |
| ***F21Y 115/10*** | (2016.01) |

(52) U.S. Cl.

CPC .............. *F21V 31/005* (2013.01); *F21S 4/10* (2016.01); *F21V 3/02* (2013.01); *F21Y 2115/10* (2016.08)

(58) Field of Classification Search

CPC ............. F21V 3/02; F21V 31/005; F21S 4/10

See application file for complete search history.

(56) References Cited

U.S. PATENT DOCUMENTS

| | | | | |
|---|---|---|---|---|
| 5,644,189 A * | 7/1997 | Busby | H01K 1/44 | 313/318.01 |
| 6,416,203 B1 * | 7/2002 | Fan Wong | H01R 33/09 | 362/267 |

(Continued)

*Primary Examiner* — Arman B Fallahkhair

(74) *Attorney, Agent, or Firm* — Thompson Patent Law Offices PC

(57) ABSTRACT

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are passed through wire apertures formed by a combined base module and cap module. In some embodiments, the base module may be deformable and deform when affixed to the cap module. In some embodiments a sealing agent may be disposed in an interior of the capture device. The sealing agent may, for example, be assembled in solid form and be at least partially liquified for distribution. In an exemplary embodiment, an LED may be captured within the capture device. The sealing agent may provide a water resistant seal between a base and a housing element.

19 Claims, 16 Drawing Sheets

Related U.S. Application Data

No. 15/721,004, filed on Sep. 29, 2017, now Pat. No. 10,584,865, which is a continuation of application No. 14/602,526, filed on Jan. 22, 2015, now Pat. No. 9,803,851.

(60) Provisional application No. 61/931,360, filed on Jan. 24, 2014.

(56) References Cited

U.S. PATENT DOCUMENTS

| | | | | |
|---|---|---|---|---|
| 6,719,441 | B2 * | 4/2004 | Wong | F21V 19/0005 362/255 |
| 7,241,032 | B2 * | 7/2007 | Qingbiao | F21V 19/0005 439/375 |
| 7,665,863 | B2 * | 2/2010 | Tseng | F21S 4/10 362/249.02 |
| 7,798,844 | B2 * | 9/2010 | Li | H01R 13/5829 439/460 |
| 8,388,213 | B2 * | 3/2013 | Yu | F21V 3/02 362/267 |
| 8,511,871 | B2 * | 8/2013 | Liu | F21V 19/0005 439/699.1 |
| 8,628,215 | B2 * | 1/2014 | Tsai | F21S 4/10 439/906 |
| 9,033,548 | B2 * | 5/2015 | Tsai | F21V 21/002 362/249.06 |
| 11,371,691 | B2 * | 6/2022 | On | F21V 17/164 |
| 2009/0080195 | A1 * | 3/2009 | Huang | F21V 31/005 362/267 |
| 2015/0300625 | A1 * | 10/2015 | Land | F21V 23/001 362/249.06 |

* cited by examiner

WATER-RESISTANT WIRED ELECTRO-MAGNETIC COMPONENT CAPTURE

CROSS-REFERENCE TO RELATED APPLICATIONS

This application is a Continuation-in-Part and claims the benefit of U.S. application Ser. No. 17/450,006, titled "Water-Resistant Wired Electro-Magnetic Component Capture," filed by Loomis, et al. on Oct. 5, 2021, which is a Continuation-in-Part and claims the benefit of U.S. application Ser. No. 17/301,850 titled "Water-Resistant Wired Electro-Magnetic Component Capture," filed by Loomis, et al. on Apr. 15, 2021, which is a Continuation and claims the benefit of U.S. application Ser. No. 16/829,937 titled "Water-Resistant Wired Electro-Magnetic Component Capture," filed by Loomis, et al. on Mar. 25, 2020, which is a Continuation and claims the benefit of U.S. application Ser. No. 16/659,302 titled "Water-Resistant Wired Electro-Magnetic Component Capture," filed by Loomis, et al. on Oct. 21, 2019, which is a Continuation and claims the benefit of U.S. application Ser. No. 15/721,004 titled "Water-Resistant Wired Electro-Magnetic Component Capture," filed by Loomis, et al. on Sep. 29, 2017 which is a Continuation and claims the benefit of U.S. application Ser. No. 14/602,526 titled "Water-Resistant Wired Electro-Magnetic Component Capture," filed by Loomis, et al. on Jan. 22, 2015 which claims the benefit of U.S. Provisional Application Ser. No. 61/931,360 titled "Water-Resistant Wired Electro-Magnetic Component Capture," filed by Jason Loomis on Jan. 24, 2014.

This application incorporates the entire contents of the foregoing application(s) herein by reference.

This application incorporates the entire contents of the foregoing application(s) herein by reference.

TECHNICAL FIELD

Various embodiments relate generally to water-resistant wired electro-magnetic device enclosures and more specifically to light strings for holidays and decorations.

BACKGROUND

Light strings are widely used during the winter season and during holidays. Wired light strings often adorn holiday trees indoors, and trees and houses outdoors. Such holiday light strings promote a festive atmosphere and bring good cheer to neighborhoods. Light strings often receive power from a wired source, such as an electrical outlet. Each lighting element of a light string must be connected to the power source via one or more wires. The light string therefore typically consists of light elements such as light bulbs or LEDS and wire elements. In some embodiments the lighting elements are wired in a serial fashion. In some embodiments the lighting elements are wired in a parallel fashion. Some light strings use various serial/parallel combinations to distribute operating power to each lighting element.

SUMMARY

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are passed through wire apertures formed by a combined base module and cap module. In some embodiments, the base module may be deformable and deform when affixed to the cap module. In some embodiments a sealing agent may be disposed in an interior of the capture device. The sealing agent may, for example, be assembled in solid form and be at least partially liquified for distribution. In an exemplary embodiment, an LED may be captured within the capture device. The sealing agent may provide a water-resistant seal between a base and a housing element.

Various embodiments may achieve one or more advantages. For example, some embodiments may provide a method of assembling a light string without the need for molding operations during the assembly process. In some embodiments, the captured electro-magnetic device may be field replaceable. For example, the capture device may be disassembled by hand, and the capture device may be replaced. In some embodiments, the base module may provide strain relief to the wires that reside in the wire apertures. In an exemplary embodiment, the base device may provide for a solderless connection of the electro-magnetic device and wire leads. For example, the base device may have alignment features for positioning a wire assembly for electrical connection to the electro-magnetic device. The alignment features may be topological to provide for tactile feedback as to proper positioning.

In some embodiments, the base device may automatically provide compressive seals to both the wires and to the cap module when coupled to the cap module. This coupling-induced compression may permit the rapid assembly of components. In some embodiments, the coupling between the cap module and the base module may provide for multiple electro-magnetic component sizes. The coupling of various component sizes may provide water resistant capture independent of the component size, within a predetermined component size range. In some embodiments the assembly yield may be improved. Cost reductions may result from such yield improvements. In some embodiments cost reductions may be realized because of the ability to use low cost parts. Inventory methods may be facilitated because, for example, final assembly molding may not be required. Cost reductions may result from manufacturing components at off-site locations from the final assembly locations.

In some embodiments, the sealing feature may have both trough and crest type of interfaces. Such a dual interface may advantageously prevent water penetration in a static configuration. Any water that seeps into a trough may gravitationally be prevented from transgressing the crest. And in another orientation, the trough and crest may exchange relative gravitational roles.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
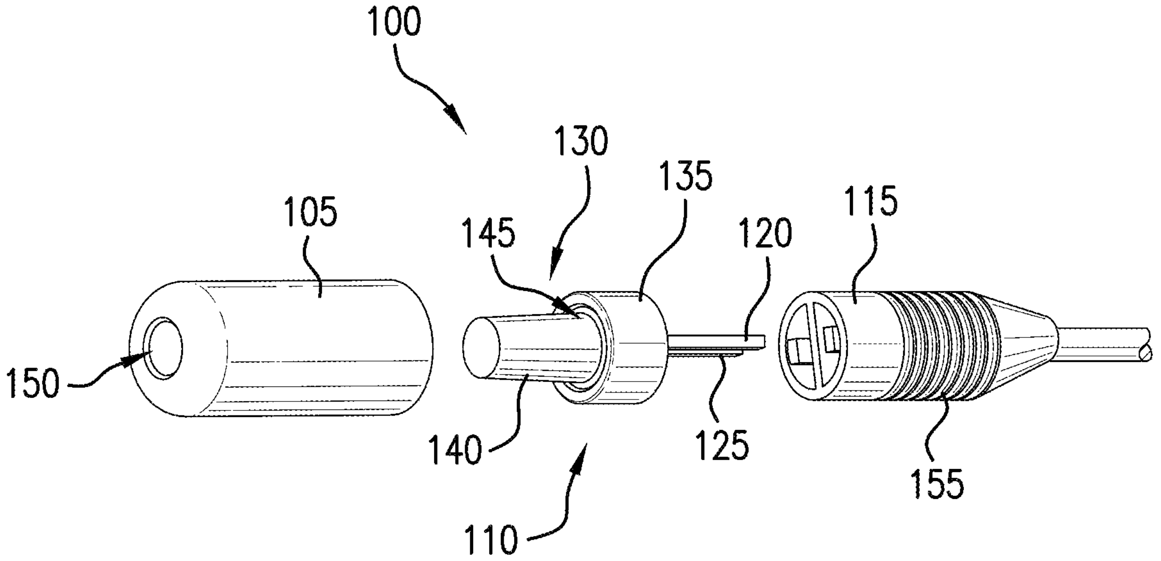
FIG. 1 depicts an exploded view of an exemplary water-resistant lighting element having a tapered LED with moat seal.

FIG. 1 depicts an exploded view of an exemplary water-resistant lighting element having a tapered LED with a moat seal. In the FIG. 1 embodiment, a lighting element 100 includes a LED cap 105, and LED 110, and a molded base 115. The LED 110 has two leads 120, 125 which are configured to be insertable into the molded base 115. The LED 110 has a lens 130 that has a substantially cylindrical base 135 and a tapered head 140. Between the tapered head 140 and the substantially cylindrical base 135 is a moat structure 145. When connected, the LED 110 is inserted into the base 115 and the cap 105 is inserted over the LED and affixed to the base 115. The cap 105 has an aperture 150 through which the tapered head 140 projects. Inside the cap 105, a circumferential inverted moat feature is formed to interface with the moat structure 145 of the lens 130. The aperture 150 may be sized to compressibly fit against the tapered head 140 when the LED 110 is fully inserted into the cap 105. The fit of the cap 105 against the tapered head 140 provides water resistance for the lighting element 100. The inverted moat feature within the cap 105 may compressibly fit within the moat structure 145 of the lens 130, which may also promote water resistance. The cap 105 may secure to the base 115 at a threaded portion 155 of the base 115. The threaded portion 155 of the base may provide water resistance to the lighting element 100. This water resistance may be promoted by the use of a deformable material in the molded base 115. The threaded portion 155 may have dimensions that are oversized, or that will result in compression when the cap 105 is secured to the base 115.

FIGS. 2A, 2B, 2C, and 2D depict exploded views of an exemplary lighting element without integrally molded leads. In the FIG. 2 embodiment, an exemplary lighting element 200 includes a cap 205, and LED 210, a lead separation/compression insert 215, a base 220 and two leads 225. The LED 210 may have a tapered head. Each of the lighting elements is shown in a cross-section in the right-side view. The lighting element 200 is assembled with the leads 225 inserted through an opening in the base 220. They are then located adjacent to the lead separation/compression insert 215. The located leads along with the lead separation/compression insert 215 are then inserted back into the opening in the base 220. When inserted into the base 220, the lead separation/compression insert 215 is shaped to provide a cavity 235 for the leads wherein the leads make contact with terminals 230 of the LED 210. When inserted into the base 220, the lead separation/compression insert 215 is also shaped to provide compression to the leads at a bottom of the base 220. This compression may provide water resistance to the lighting element 200. After the located leads and the lead separation/compression insert 215 are inserted into the base 220, the LED 210 can be inserted into the assembly. The LED may then make contact with the leads 225 within the cavity 235. The cap 205 can then be put over the LED 210 and connected to the base 220. An aperture in the cap 205 may compressibly fit the tapered head of the LED 210 to promote water resistance. The LED 210 may have a lens with a moat, and the cap 205 may have an inverse moat in some embodiments. These moat features may provide resistance against the ingress of water, for example, via a distal opening in the cap 205. The cap 205 may screw onto the base 220 in some embodiments. In some embodiments the cap 205 may press or snap onto the base 220. The cap 205 may compressibly fit onto the base 220 to provide resistance against the ingress of water, for example, via a proximal opening in the cap 205.

Figure 3C:
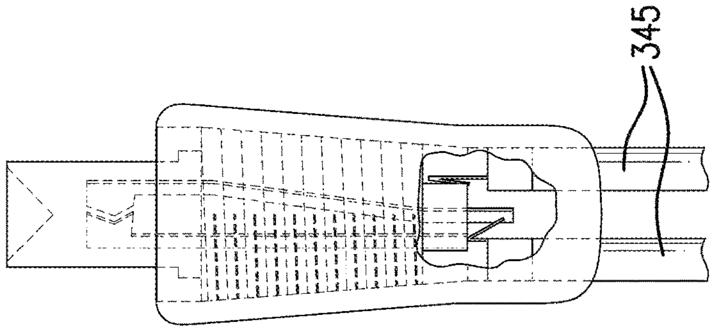
FIGS. 3A, 3B, and 3C depict an exemplary lighting element having a rotationally independent wire connection.
Figure 3B:
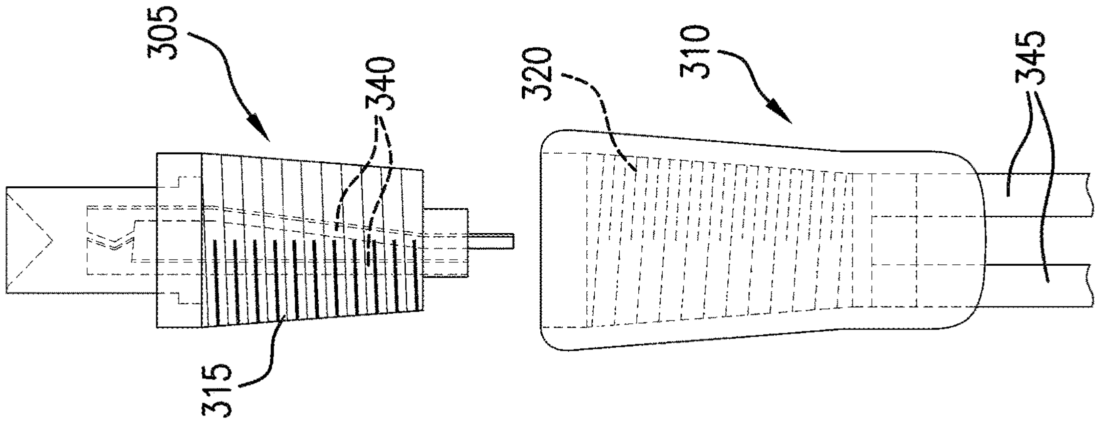
Figure 3A:
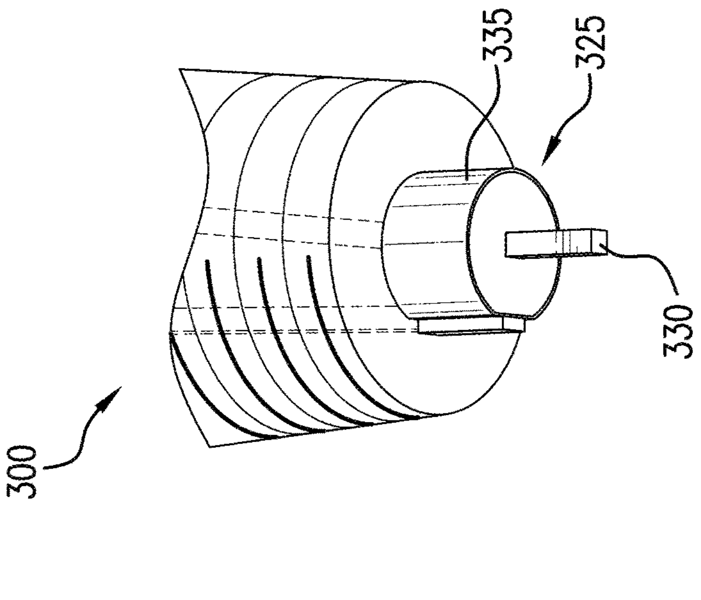
Figure 4D:
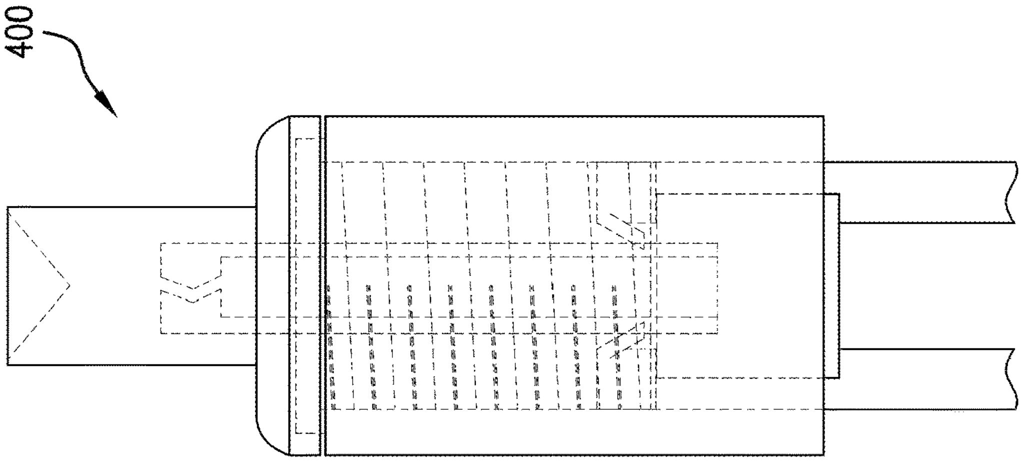
FIGS. 4A, 4B, 4C, and 4D depict an exemplary lighting element having a wire compressing element.
Figure 4C:
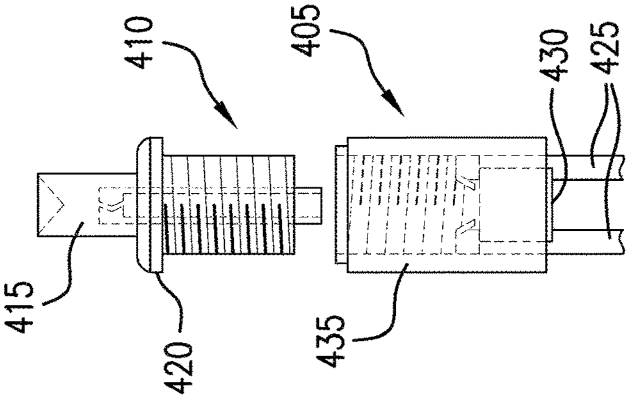
Figure 4B:
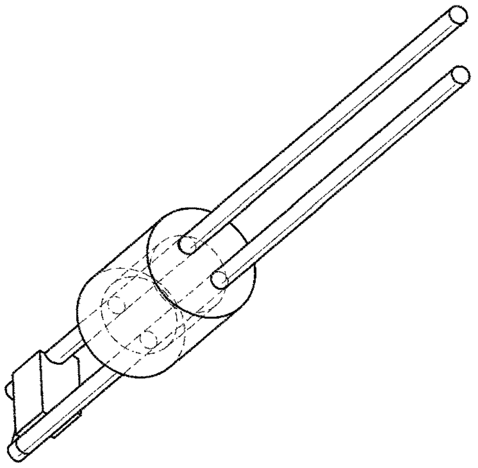
Figure 4A:
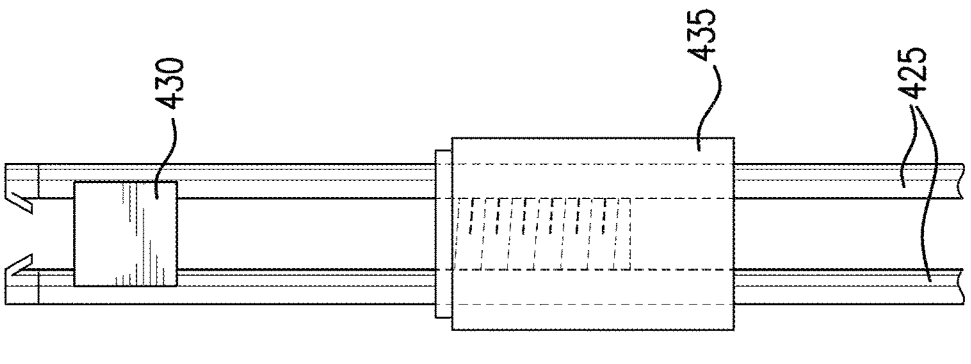
Figure 5A:
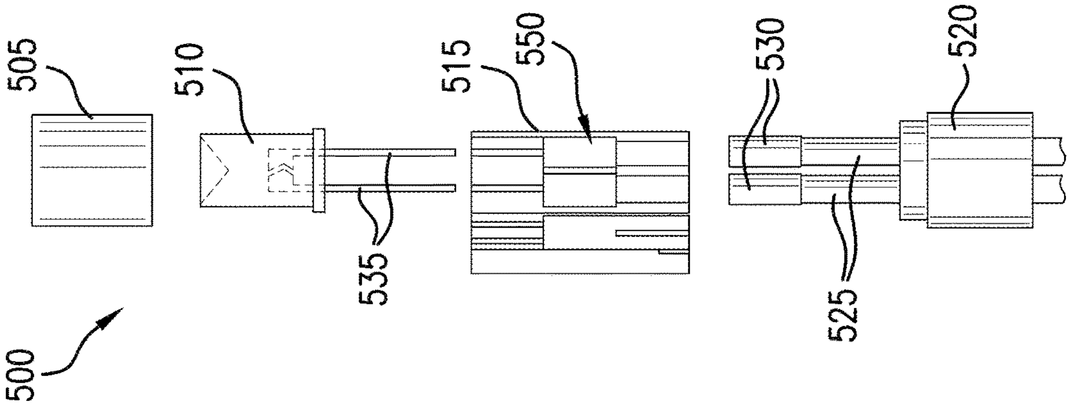
FIGS. 5A, 5B, 5C, and 5D depict an exemplary lighting element with a clam-shell wire securing insert.
Figure 5B:
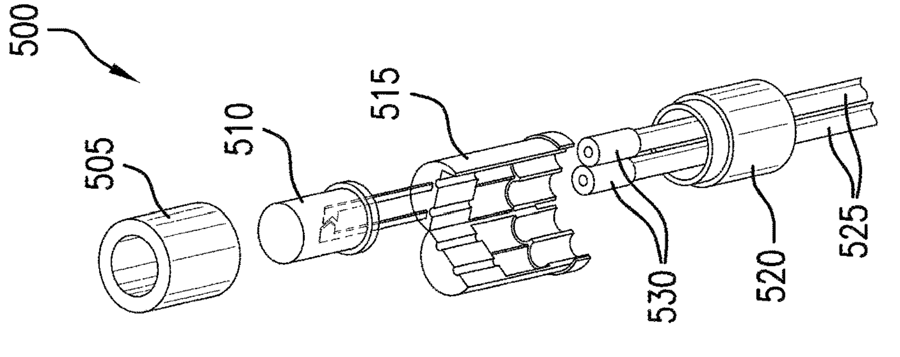
Figure 5C:
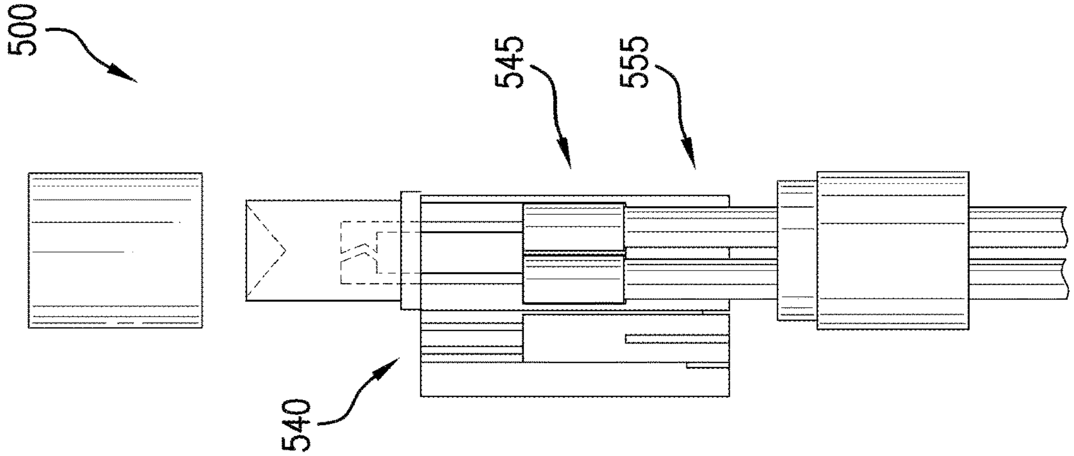
Figure 5D:
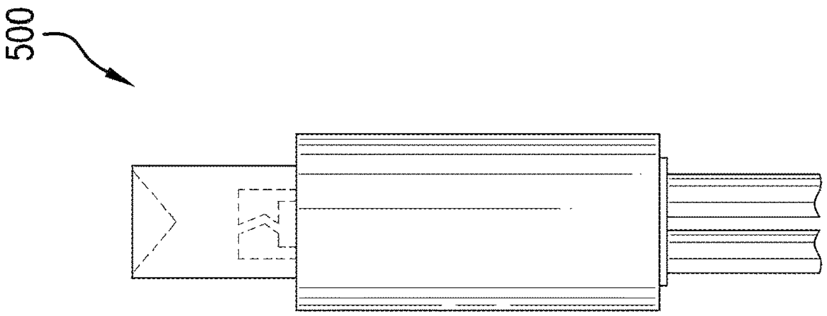
Figure 6D:
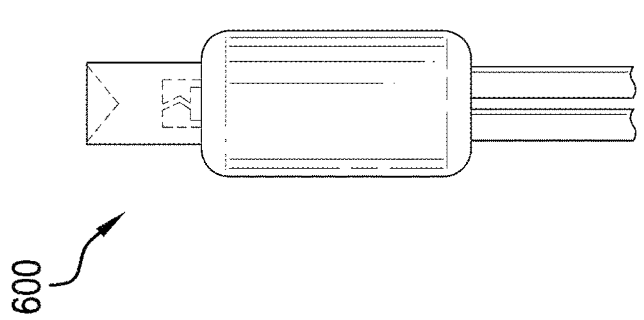
FIGS. 6A, 6B, 6C, and 6D depict an exemplary lighting element with a clam-shell body.
Figure 6C:
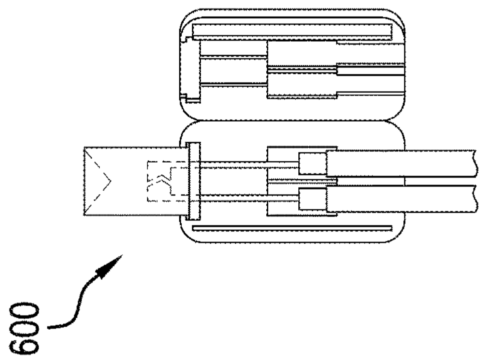
Figure 6B:
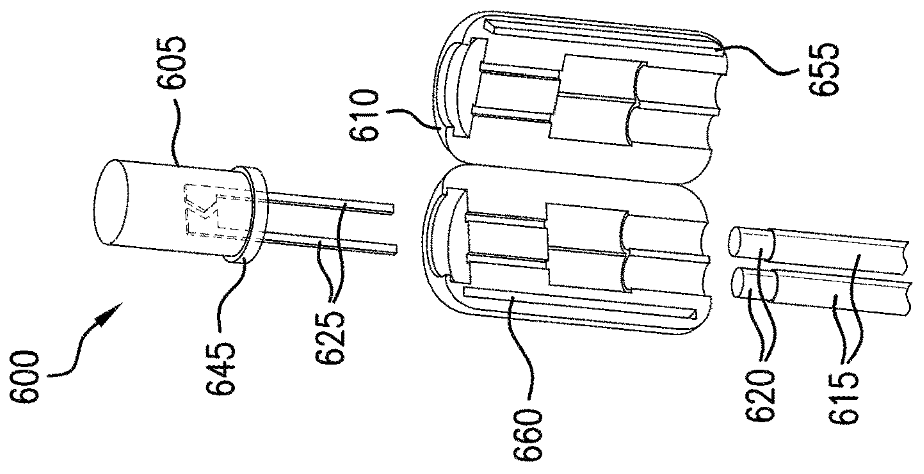
Figure 6A:
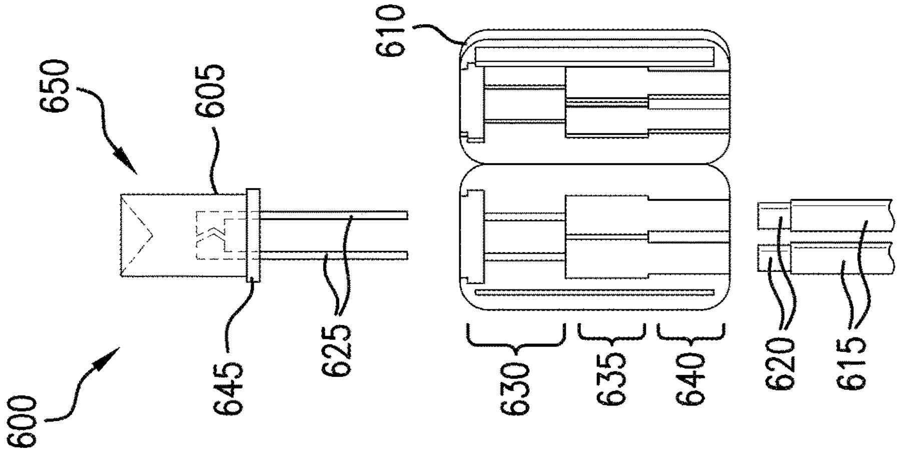

FIGS. 3A, 3B, and 3C depict an exemplary lighting element having a rotationally independent wire connection. In the FIG. 3 embodiment, an exemplary lighting element 300 has an LED insert 305 and a base 310. The LED insert 305 has tapered threads 315. The base 310 has complementary tapered threads 320. The LED insert 305 can be attached to the base 310 via the tapered threads 315, 320. The LED insert 305 has a rotationally invariant electrical connector 325. The rotationally invariant electrical connector 325 has a center contact 330 and a radial contact 335 surrounding the center contact 330. The leads of the LED 340 may be electrically connected to the center contact 330 and the radial contact 335 according to a predetermined polarity convention. Wire leads 345 within the base 310 may have contacts located so as to connect one of the wire leads 345 to the center contact 330 and the other of the wire leads 345 to the radial contact 335. The tapered threads 315, 320 may provide a compression fit and may promote water resistance of the lighting element 300.

In some embodiments, a lighting element may include a LED insert and a base. The LED insert may have threads, for example. The base may have complementary threads. The LED insert can be attached to the base via the threads. The LED insert may have an LED that has two conductive leads. The conductive leads may project through a bottom of the LED insert. Electrical wires within the base may provide contacts which are located to contact the projecting LED leads when the LED insert is connected to the base. The threads of the LED insert may have a predetermined configuration so as to ensure that when the LED insert is fully screwed into the base, the LED leads will align with the contacts of the base electrical wires. A proper polarity of the connection may be determined by the thread dimensions, for example.

FIGS. 4A, 4B, 4C, and 4D depict an exemplary lighting element having a wire compressing element. In the FIGS. 4A, 4B, 4C, and 4D embodiment, a lighting element 400 includes a base assembly 405 and a light assembly 410. The light assembly 410 includes an LED 415 and a threaded insert 420. The base assembly 405 includes two wire leads 425, a wire separator 430 and a base housing 435. The wire leads 425 may be inserted through a slotted aperture in the bottom of the base housing 435. The wire separator may then be inserted between the two wire leads 425. The separator 430 and the two wire leads 425 may then be located into the base housing 435. The wire separator 430 may be sized to provide compression of the wire leads 425 between the wire separator 430 and the base housing 435. The light assembly 410 may then be inserted into the base assembly 405. In some embodiments the light assembly 410 may snap into the base assembly 405. In some embodiments, the insertion into the base assembly may be keyed to provide for proper polarity connection between the LED 415 and the wire leads 425.

FIGS. 5A, 5B, 5C, and 5D depict an exemplary lighting element with a clam-shell wire securing insert. In the FIGS. 5A, 5B, 5C, and 5D embodiment, an exemplary lighting element 500 includes an LED cap 505, an LED 510, a clam-shell 515, a base 520 and two wires 525. Each of the two wires 525 has a connector 530 configured to receive a lead 535 of the LED 510. The clam-shell 515 is configured to capture the connection of the connectors 530 and the leads 535 of the LED 510. The clam-shell 515 has a top region 540 through which the LED leads 535 project. The clam-shell 515 has a middle region 545 which when closed creates a cavity 550 sized to contain the connectors 530 of the wires 525. The clam-shell 515 has a bottom region 555 which is configured to compress the wires when the clam-shell 515 is closed.

To assemble the lighting element 500, the wires 525 may be inserted through an aperture in the base 520. The wires 525 may then be aligned to the clam-shell 515 and the clam-shell 515 may then be closed. The wire containing clam-shell 515 may then be retreated back into the base 520. When the clam-shell 515 is inserted into the base 520, the base may put the clam-shell 515 into compression. This compression of the clam-shell 515 may in turn provide compression to wire insulation surrounding the wires 525. This compression may provide for water resistance to water incident upon the wire/clam-shell interface. The LED leads may be inserted into apertures in the top of the clam-shell. The apertures in the top of the clam-shell 515 may be sized to receive the LED leads 535 and direct the leads to the connectors 530. After the LED 510 is attached to the assembly, the LED cap 505 may be inserted over the LED 510 and coupled to the base 520. In some embodiments the LED cap 505 may compressibly fit around a base of a lens of the LED. This compression fit around the base of the LED may substantially prevent water from entering the assembled lighting element 500 from without. In some embodiments, the LED cap 505 may compressibly fit around the base 520 so as to facilitate water resistance at the base 520.

FIGS. 6A, 6B, 6C, and 6D depict an exemplary lighting element with a clam-shell body. In the FIGS. 6A, 6B, 6C, and 6D embodiment, an exemplary lighting element 600 includes an LED 605, a clam-shell body 610 and two wires 615. Each wire 615 has a connector 620 configured to connect to a lead 625 of the LED 605. The clam-shell body 610 has three regions, a LED-compression region 630, a connection-cavity region 635 and a wire-compression region 640. The LED-compression region 630 is configured to put a cylindrical base 645 of a lens of the LED 605 into compression when the clam-shell is closed. The connection-cavity region 635 is configured to capture the connectors 620 within the clam-shell body 610, while permitting the clam-shell to fully close. The wire-compression region 640 is configured to compress the wires 615 when the clam-shell body 610 is closed. The clam-shell body has a snap feature 650, 655, one along the length of the body on each side of the open clam-shell body 610. These snap features 655, 660 are configured to couple to one another and to provide for a secure connection of two sides of the clam-shell body 610 when closed.

Figure 7A:
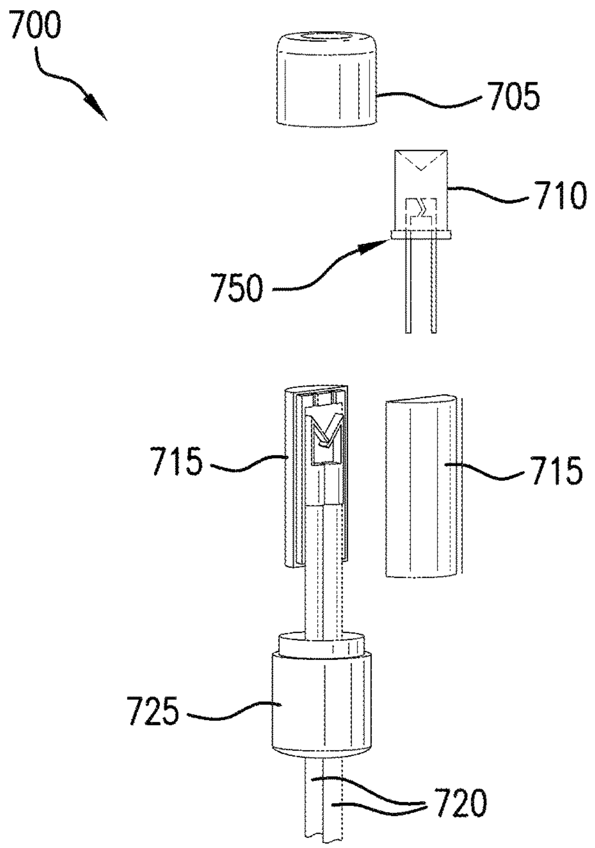
FIGS. 7A and 7B depict an exemplary lighting element having a sandwich insert.
Figure 7B:
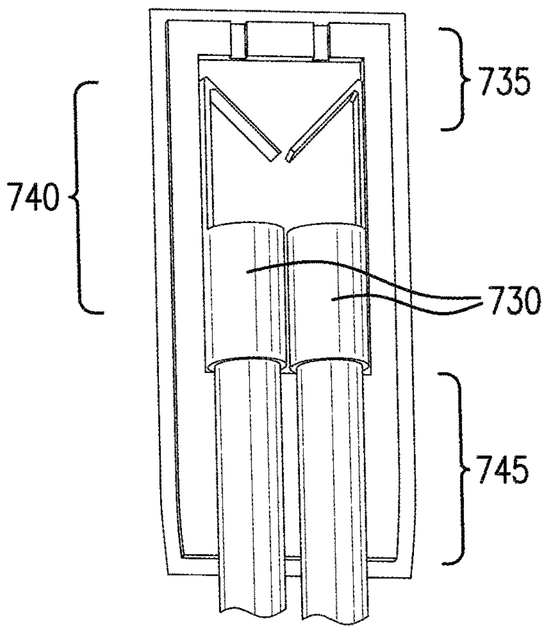

FIGS. 7A and 7B depict an exemplary lighting element having a sandwich insert. In the FIGS. 7A and 7B embodiment, a light unit 700 has a cap 705, and light element (LED 710), two sandwich captures 715 two wires 720, and a base 725. Each of the two wires 720 has a wire connector 730. The two wires 720 may be first placed into one of the sandwich captures 715. The sandwich capture assembly has three regions, an LED-lead region 735, a connector-cavity region 740, and a wire-lead region 745. When the two wires 720 have been properly located onto one of the sandwich captures 715, the two sandwich captures 715 are affixed to one another. In some embodiments the sandwich captures have means for snap connecting to each other. In some embodiments, the sandwich captures have locating features, which provide tactile feedback indicative of proper alignment. The sandwich captures 715 along with the captured wires 720 may then be inserted into the base 725. The base 725 may provide compression to the sandwich captures 715. When the sandwich captures 715 are inserted into the base 725, the wire-lead region 745 may squeeze the wires 720. The wire-lead region 745 may be compressed, both together and against the wires 720 so as to provide water resistance.

In some embodiments, the light unit 700 is depicted from a side perspective. Here, the wires 720 are shown being located in sandwich captures 715. The sandwich captures 715 may be closed upon the wires 720. A water resistant seal may result near the location where the wires 720 enter into the sandwich captures 715. The sandwich captures 715 may be sized to both squeeze insulation surrounding the wires 720, and to press against each other. The base may be sized to provide compression to the sandwich captures 715. This compression may result in a water resistance seal at the bottom of the sandwich captures 715. The LED 710 may project from the sandwich captures 715 after insertion into the top of the sandwich captures 715. The leads of the LED 710 may contact the wire connectors 730 in the connector-cavity region 740 of the wire captures 715. The cap 705 may be connected to the base 725.

When assembled, the cap 705 may compress a cylindrical base 750 of the LED 710. In some embodiments, the cap 705 may compress the wire captures 715. In an exemplary embodiment, the cap 705 may connect to the base 725. The cap 705 may be attached to the base 725 with an adhesive in some embodiments. In some embodiments, the cap 705 may be press fit to the base 725. In an exemplary embodiment, a circumferential ridge on one of the members may mate with a circumferential valley on the other member. In some embodiments, a tactile snap may indicate that the two members have been successfully attached to one another. In some embodiments, both the cap 705 and the base 725 may have complementary screw threads to attachment. In an exemplary embodiment, the screw threads may be of a tapered nature to facilitate a tight seal between the two members. For example, the diameter of the base 725, upon which the threads are formed, may increase with each rotation of engagement. In this way, the cap 705 may increasingly tighten as it is being rotated onto the base 725.

FIGS. 8A, 8B, 8C, 8D, 8E, and 8F depict exemplary lighting elements having wire compression elements. In the FIG. 8A embodiment, an exploded view of an exemplary lighting element 800 is depicted. The lighting element 800 includes a tapered cap 805. The lighting element 800 has an LED 810 with a tapered lens 815. The LED 810 has leads 820 shown connected to contacts 825 of wires 830. A base 835 is shown positioned to be inserted between the wires 830. The base 835 is shown with threads 840 which may mate with complementary threads 845 in the tapered cap 805. The threads 845 of the tapered cap 805 may follow the taper of the cap 805. For example, as one travels along the threads from a bottom end 850 of the cap 805 inwardly, the diameter of each subsequent spiral becomes smaller. In some embodiments, the threads 840 of the base 835 may be on a tapered base 835. In some embodiments, the threads 840 may follow the taper of the base 835.

Figure 8A:
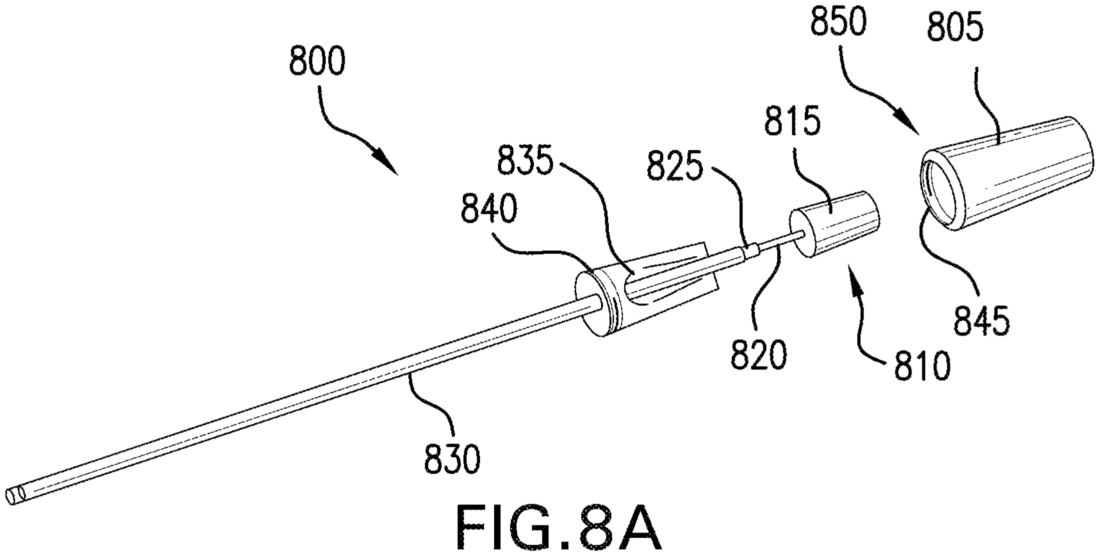
FIGS. 8A, 8B, 8C, 8D, 8E, and 8F depict exemplary lighting elements having wire compression elements.
Figure 8B:
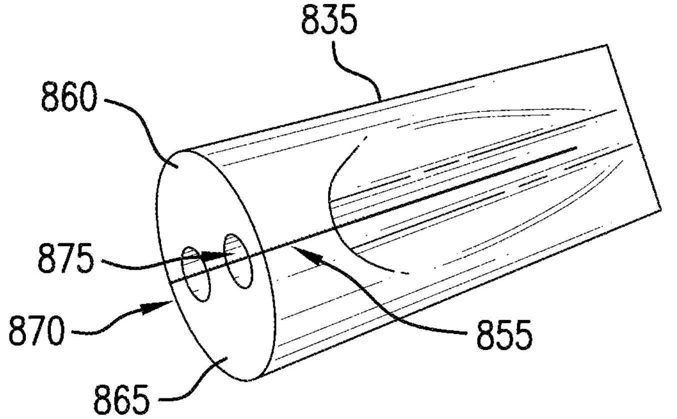

FIG. 8B depicts an exemplary lighting element having a split wire compression element. Here, an exemplary base 835 is shown in isolation. This exemplary base 835 is depicted with a split 855 along a portion of a longitudinal length. The split 855 may divide the base 835 into substantially equally sized halves 860, 865. The base 835 may snap into a cap 805. When inserted into the cap 805, the cap 805 may put the two halves 860, 865 into compression with one another. When in compression, two wire apertures 870, 875 may compress wires that have been inserted. Various means for connecting the base to the cap may be used. In some embodiments, a circumferential lip extending inwardly around the inside of the bottom end of the base may provide the tactile snap indicating proper insertion of the base 835 into the cap 805. In some embodiments, a circumferential ridge around one of the members may mate with a circumferential groove in the other member. In some embodiments, complementary screw threads may be molded into the two members. In some embodiments, the taper of one or both members may facilitate compression. Such compression may provide a water-resistant seal to the lighting element 800.

In some embodiments, an exemplary base may have threads at a bottom portion of the base. An exemplary cap may have complementary threads at a bottom portion of the cap. Wire leads may be inserted into the base. Electrical wires may be inserted into an exemplary base. Leads of an LED may be electrically connected to the wires within the base. An exemplary cap may have a lumen through which the LED may be inserted. The cap may attach to the base. When the cap attaches to the base, the cap may compress the LED. Circumferential compression around the LED may provide water resistance at this compressed location. When the cap attaches to the base, the base may be put into compression. The compression of the base may in turn compress insulation surrounding the wires. The compression of the base may also create a circumferential seal between the base and the cap.

In some embodiments, an exemplary lighting unit may include a two-piece wire spacer. The two-piece wire spacer may capture two wires and may be located adjacent to an LED which is connected to the wires. A two-piece wire spacer may have one or more circumferential valleys. The LED husk may have one or more corresponding circumferential ridges on the inside of its lumen. The husk ridges may mate with the spacer valleys when the husk is connected to the two-piece wire spacer. Having one or more ridges and the corresponding valleys may provide a water-resistant seal between the husk and the two-piece wire spacer.

In some embodiments an exemplary LED husk may have one or more circumferential husk ribs near a bottom end of the husk. The husk ribs may mate with substantially complementary circumferential moat features on a base element. The husk has a tapered profile with a wall thickness. The husk may have a micro-flashing feature at a top end of the husk. The micro-flashing feature may be compressed when an LED is inserted into the husk. This compression of the micro-flashing feature may provide a water resistant seal between the husk and the LED.

Figure 8C:
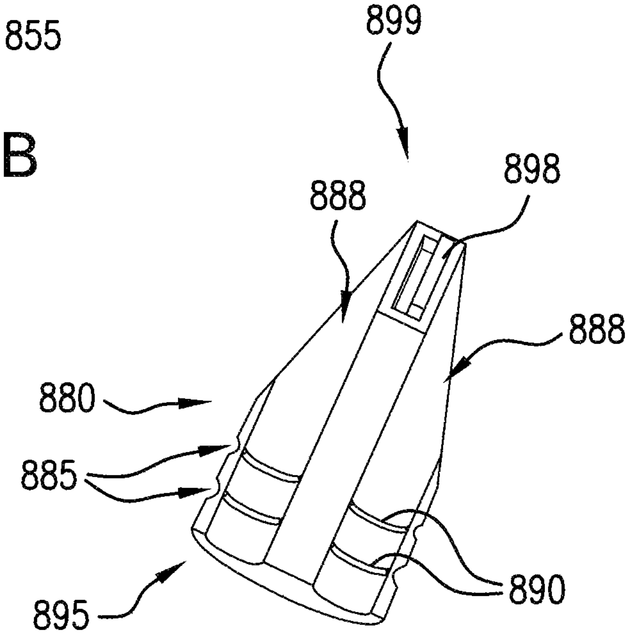

FIG. 8C depicts a close-up view of one piece of an exemplary two-piece wire spacer plug. In the FIG. 8C embodiment, an exemplary sandwich piece 880 of a two-piece wire sandwich is depicted. The sandwich piece 880 is shown with two semi-cylindrical wire apertures 888 (e.g., corresponding to 875) along a longitudinal length. Each semi-cylindrical wire aperture 888 has two semi-cylindrical ribs 890 near a wire end 895 of the sandwich piece 880. Each semi-cylindrical rib 890 may locally compress insulation surrounding a wire located in the semi-cylindrical wire aperture 888. The sandwich piece 880 has a registration key 898 near an LED end 899 of the sandwich piece 880. The sandwich piece 880 may be joined with a second identical sandwich piece 880 placed in a key-to-key fashion. By doing so, the semi-cylindrical wire apertures 888 of the two joined sandwich pieces 880 may form a substantially cylindrical wire aperture (e.g., 875). The semi-cylindrical ribs 890 of the joined sandwich pieces 880 may form substantially cylindrical ribs circumscribing wires inserted into the substantially cylindrical wire apertures. The substantially cylindrical ribs may cylindrically compress wire insulation of the inserted wires. This compression may result in a water resistant seal between the sandwich pieces 880 and the inserted wires. The sandwich piece 880 also has semi-cylindrical moats 885 in the exterior face of the sandwich piece 880. These semi-cylindrical moats 885 of the joined sandwich pieces 880 may form substantially cylindrical moats circumscribing the outside faces of the joined sandwich pieces 880. These moats may be configured to be coupled with substantially complementary rib features on a cap element.

Figure 8D:
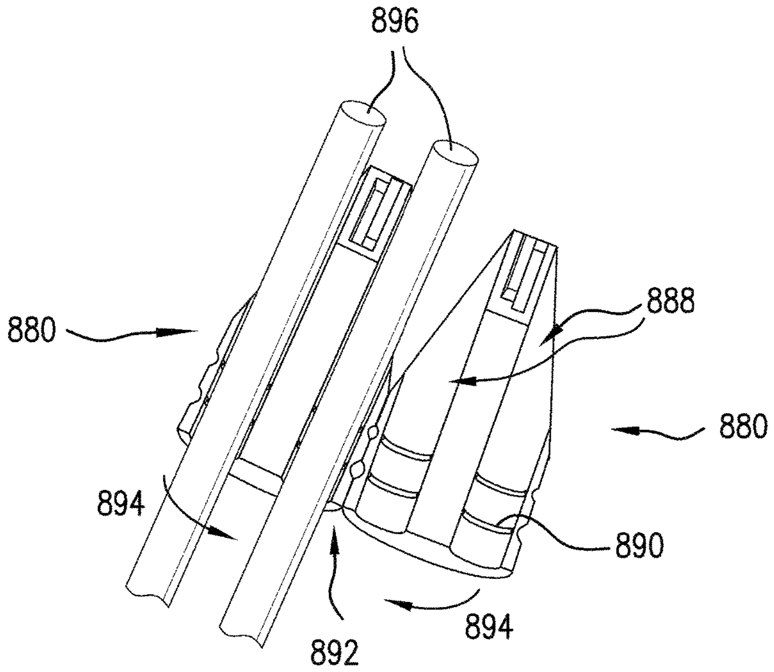

FIG. 8D depicts an exemplary two-piece wire spacer plug having a two-piece spacer plug placed in a key-to-key fashion. In the illustrative embodiment shown in FIG. 8D, the two exemplary sandwich pieces 880 are connected by a hinge 892. As shown, the sandwich pieces 880 may be hingedly opened and closed about the hinge 892 as shown in the arrows 894. In some implementations, the sandwich pieces 880 may be disassembled at the hinge. In the depicted example, two inserted wires 896 are placed at one side of the sandwich piece 880 in the two semi-cylindrical wire apertures 888. For example, once the joined sandwich pieces 880 are closed about the hinge 892 (e.g., enclosing the inserted wires 896), the semi-cylindrical ribs 890 may form substantially cylindrical ribs circumscribing the inserted wires 896. The cylindrical ribs 890 may compress wire insulation of the inserted wires 896 and result in a water-resistant seal between the sandwich pieces 880 and the inserted wires 896.

Figure 8E:
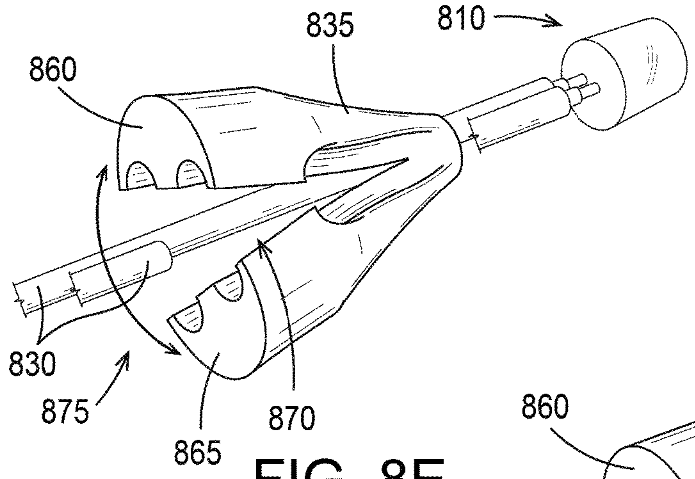

FIG. 8E depicts an exemplary partially opened lighting element as described with reference to FIGS. 8A and/or 8B. For example, the split 855 may divide the base 835 into the substantially equally sized halves 860, 865. As shown in this example, the substantially equally sized halves 860, 865 are hingedly opened along the split 855. For example, as depicted, wires 830 may be placed in one half of the two wire apertures 870, 875 before the wires are secured by closing the base 835. The base 835 may, by way of example and not limitation, be held closed by coupling to a module (e.g., insertion into a cap module such as the tapered cap 805). For example, as depicted, the partially opened lighting element may allow for assembly of the base 835 onto the wires 830 after assembly of the LED 810 onto the wires 830.

Figure 8F:
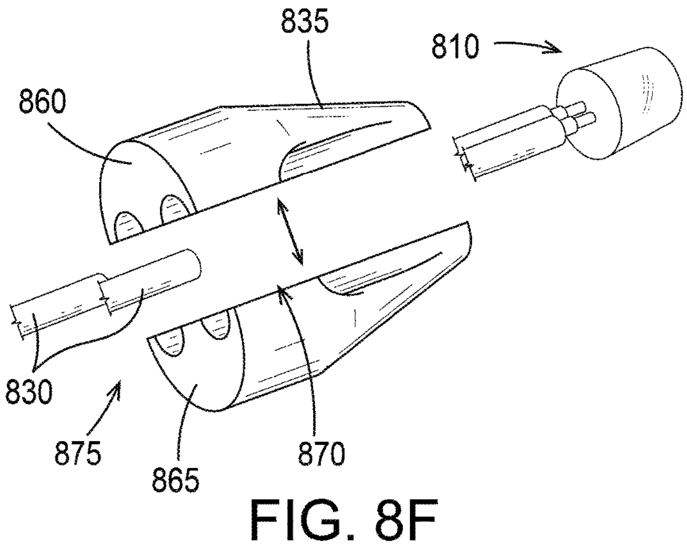

FIG. 8F depicts an exemplary partially opened lighting element as described with reference to FIGS. 8A and/or 8B. For example, the split 855 may entirely divide the contacts 825 into substantially equally sized halves 860, 865. As shown in this example, the halves 860, 865 are entirely separated along the split 855. For example, as depicted, the wires 830 may be placed between the halves 860, 865 to align with and/or into one half of the two wire apertures 870, 875 before the wires are secured by closing the base 835. The base 835 may, by way of example and not limitation, be held closed by coupling to a module (e.g., insertion into a cap module such as the cap 805). For example, as depicted, the entirely opened lighting element may advantageously allow for assembly of the base 835 onto the wires 830 after assembly of the LED 810 onto the wires 830.

In some embodiments, a wire compression piece may have one or more elliptical grooves. Each elliptical groove may have a varying groove depth with respect to an exterior surface of the wire compression piece. The groove depth may, for example, vary as a function of the angular location about a wire-end of the wire compression piece. In at least some of the depicted embodiments with respect to FIGS. 8A-8F, each elliptical groove may be deepest near a split demarking two halves (860, 865) of the wire compression piece. The elliptical groove may be shallowest at a location approximately ninety degrees from the split. An LED cap having two substantially complementary ribs around the wire end of the cap may, for example, be attached to the wire compression piece. In some embodiments, the LED cap may have substantially uniform rib heights with respect to an inside surface of the LED cap. In such an embodiment, the attachment of the LED cap to the wire compression piece may preferentially compress the two halves together. This compression may, for example, create a water-resistant seal between the two halves of the wire compression piece.

In some embodiments, a split wire space plug may have a crumple feature. The crumple feature may be compressed when the split wire space plug is coupled to an LED cap capturing an LED.

Figure 9A:
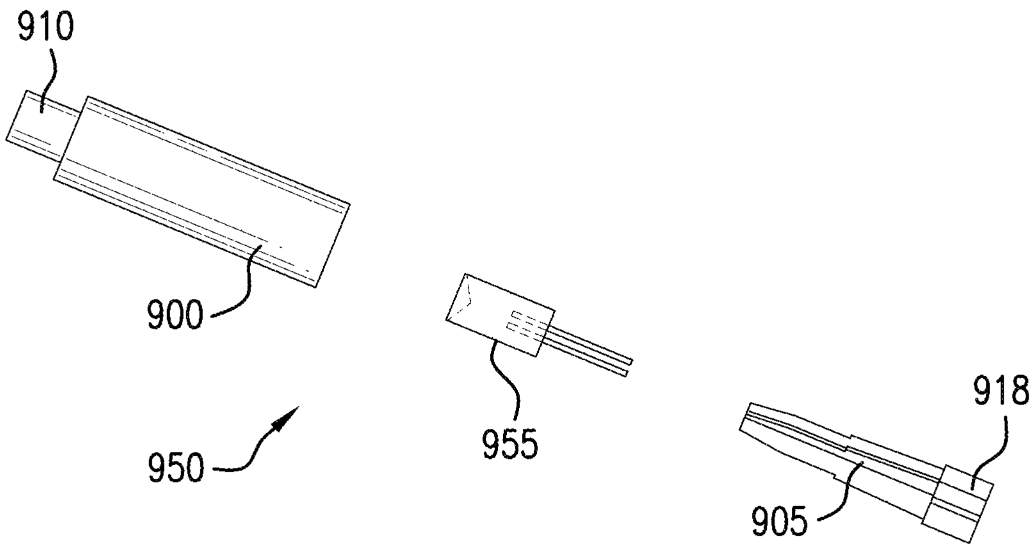
FIGS. 9A and 9B depict an exemplary wire-lead plug and an exemplary LED husk.
Figure 9B:
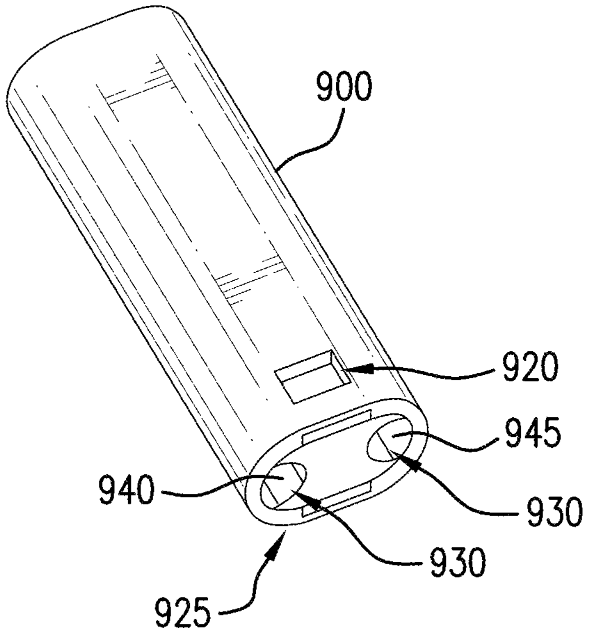

FIGS. 9A and 9B depict an exemplary wire-lead plug and an exemplary LED husk. In the depicted embodiment, an exemplary LED husk 900 and an exemplary clip-in plug 905 are shown. The clip-in plug 905 may facilitate connection between an LED and a pair of wires. The clip-in plug 905 may then be inserted into the LED husk 900. The LED husk 900 may have an LED aperture through which a top of a lens of the LED may project. In the depicted embodiment, a clear cap 910 permits light to transmit through the husk 900. The clip-in plug 905 may have a securing clip 915 which may snap into a clip aperture 920 in the LED husk 900 when inserted. FIG. 9B depicts the exemplary clip-in plug 905 has been inserted into the LED husk 900. The insertion of the clip-in plug 905 to the LED husk 900 may cause compression between the LED husk 900 and a captured LED. The connected clip-in plug 905 and LED husk 900 combination may also provide compression at a wire end 925 where the two members are adjacent to one another. Two wire apertures 930 are formed when the clip-in plug 905 and the LED husk 900 are mated. These apertures may compress inserted wires between an inside wall 940 located on the clip-in plug 905 and an outside wall 945 located on the LED husk 900.

In the depicted embodiment, an exemplary lighting element 950 includes an LED husk 900 (e.g., a clear cap), an LED 955, and a plug 905. In this embodiment, the LED 955 may be connected to electrical wires located along the plug 905. The assembly may then be inserted into the LED husk 900. The plug 905 and the LED husk 900 may then have a compression interface at a wire end 925 of the plug 905. In some embodiments, only a top cylindrical portion of the clear cap 900 may be translucent or transparent. In some embodiments the entire clear cap may be translucent or transparent.

In an illustrative embodiment, the LED 955 may be secured within the cap 900 with epoxy. In some embodiments the LED may be secured to the plug 905 with epoxy. The epoxy may be a transparent epoxy in some exemplary embodiments. In some embodiments, the epoxy may be a translucent epoxy. The epoxy may seal the assembly. In some embodiments the epoxy seal may make the assembly water resistive. The enclosed assembly may securely contain the liquid epoxy until the curing process is complete. The enclosed assembly may advantageously permit automation of epoxied light strings, as the epoxy remains confined within the assembly during curing.

Figure 10A:
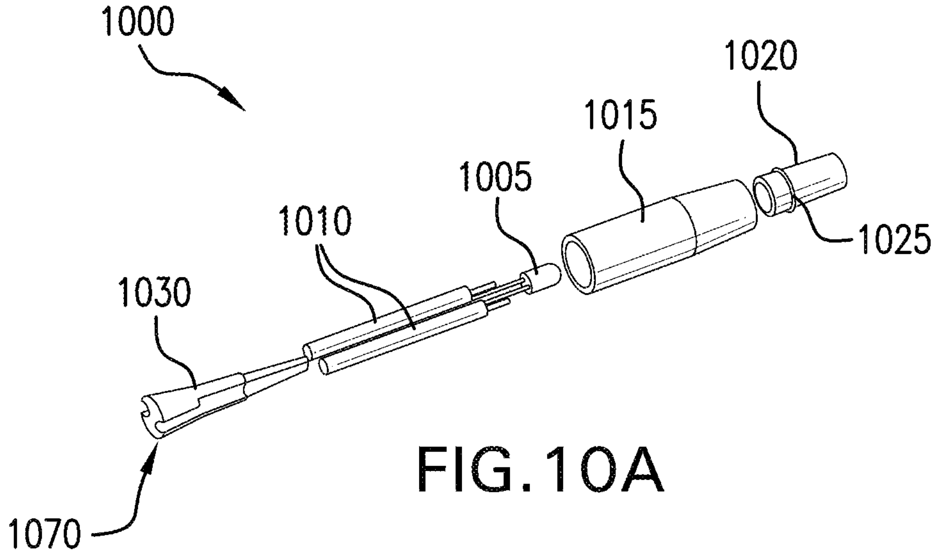
FIGS. 10A and 10B depict an exemplary exploded lighting element which uses an injected sealing agent.
Figure 10B:
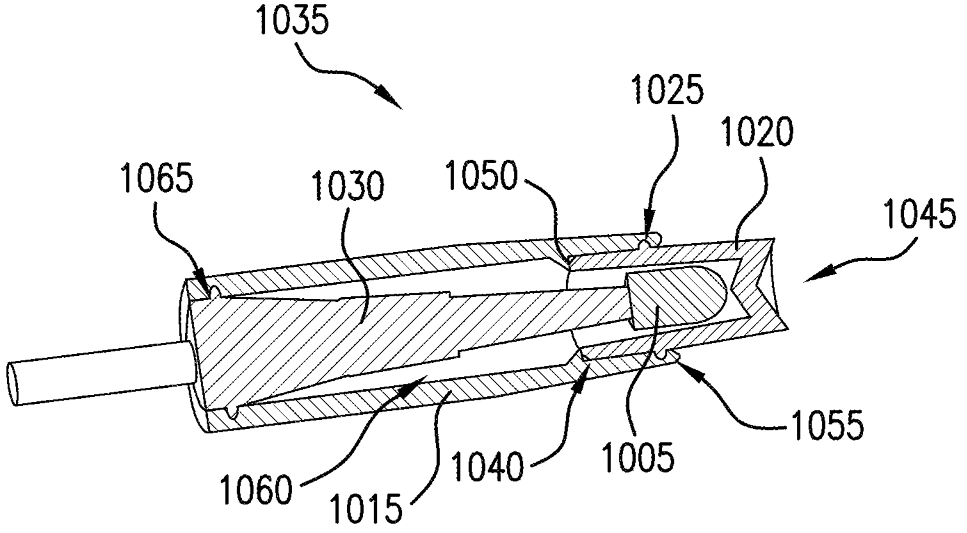

FIGS. 10A and 10B depict an exemplary exploded lighting element which uses an injected sealing agent. In the FIGS. 10A and 10B embodiment, an exemplary exploded light string element 1000 includes an LED 1005 which is attached to two lead wires 1010. The LED 1005 and lead wires 1010 may be inserted into a light enclosure during assembly. The light enclosure is depicted as having two components, a lampholder 1015 and a lens 1020. The lens 1020 may have an annular feature 1025 for providing assembly location with a complementary annular feature (not depicted) within the lampholder 1015. The annular feature 1025 may provide a water resistant connection with the lampholder 1015 when properly coupled to the lampholder 1015. The assembled lampholder 1015 and lens 1020 combination may receive an injection of a sealing agent and the LED 1005 and lead wires 1010 may be inserted into the assembly. Various types of sealing agents may be used. By way of example and not limitation, various epoxies, rubber cements, or urethanes may be used. The sealing agents, when cured or dried may provide a water resistant seal within the light string element 1000. A plug 1030 may be inserted after or along with the insertion of the LED 1005 and lead wires 1010. The plug 1030 may provide a compression fit between the lead wires 1010 and the lampholder 1015.

In the FIG. 10B embodiment, an assembled light string element 1035 (without the lead wires) is shown. In some embodiments a lampholder 1015 may be made of an opaque material. For example, a colored polypropylene may be used. Variously colored dies may provide decoratively colored lampholders 1015. In some embodiments, the lampholder 1015 may be preassembled to a lens 1020. In some embodiments, the preassembly may include inserting a lens 1020 into a lampholder 1015. In some embodiments, the lens 1020 may be coated with an adhesive prior to assembly. In some embodiments, the lampholder 1015 may be molded onto the lens 1020. The lens 1020 may be made of any of a variety of transparent or translucent materials. For example, the lens 1020 may be made of acrylic. In some examples, polycarbonate lenses may be used. In some embodiments the lens 1020 may be made of glass. The assembled enclosure may then include both the lens 1020 and the lampholder 1015.

In these depictions, an exemplary lens 1020 is shown. Various sizes and types of lens 1020 (e.g., lens caps) may be used. For example, standard sized lens caps, such as, for example, C5, C6, or M7 lens caps may be used. Non-standard sizes may be used in some embodiments. A threemillimeter wide-angle lens cap may be used. In some embodiments, one or more annular feature 1025 may encircle the lens near a base region 1040 of the lens 1020. The lens may be concave, flat or convex at an illumination region 1045 of the lens 1020.

In some embodiments the lens 1020 may, for example, have an aperture in a distal end. The LED 1005 may, for example, at least partially protrude through the aperture in the lens 1020 upon assembly. The LED 1005 may, for example, be provided with an engagement surface. The engagement surface may, for example, be configured to engage a surface of the lens 1020 (e.g., upon axial assembly of the LED 1005 through the aperture of the lens 1020) such that a seal is formed between the LED 1005 and the lens 1020. The seal may, for example, be formed with the assistance of a sealing element (e.g., adhesive, epoxy, wax, thermoset polymer).

FIG. 10B depicts a cross section of an exemplary assembled lighting element which uses an injected sealing agent. In the FIG. 10B embodiment, an exemplary assembled lighting element 1000 includes an LED 1005 inserted into a lighting housing. The LED 1005 is inserted into a lens 1020 of the lighting housing. The lens 1020 has been coupled to a lampholder 1015. The lampholder 1015 has a shelf 1050 which provides an end-point stop for the insertion of the lens 1020. A protruding annular feature 1025 on the lens 1020 mates with a complementary recessed feature 1055 on the lampholder 1015 when the lens 1020 is inserted into the lampholder 1015. The mating features 1050, 1025, 1055 may provide a standard interface for a variety of lens designs. An adhesive sealant may have been injected into an internal cavity 1060 of the lighting housing. The sealant may substantially surround the LED and provide water resistance to the assembly. A plug 1030 may contain the sealant while the sealant is curing or drying. The complete assembly may be transported or moved during assembly even before the sealant is fully cured or set up.

This figure shows the mating interface between an exemplary plug 1030 and an exemplary lampholder 1015. In some embodiments an annular ring 1065 may project for the substantially cylindrical surface of the plug 1030. In some embodiments, the annular ring 1065 may project a predetermined distance into lead wire channels 1070 to project into the insulation covering the lead wires.

An exemplary manufacturing process may proceed using one or more of the following processing steps. The lampholder 1015 may be mated with the lens 1020 at one particular manufacturing facility. For example, polypropylene lampholders 1015 may be molded onto acrylic lenses. At a second manufacturing site, the LEDs 1005 may be galvanically bonded to the lead wires 1010, in a contiguous chain fashion. A spool of connected LEDs may be the end product of this manufacturing step. Both of the above manufactured sub-assemblies may then be shipped to a final assembly site, where first a plug 1030 may be inserted into each LED 1005 of the lead wire 1010 connected chain of LEDs 1005. A controlled dose of an epoxy may be injected in the lampholder/lens assemblies, and then each LED/plug inserted into the lampholder/lens enclosure, capturing the still liquid epoxy. As each LED element is completed, the LED element may be safely moved during the assembly of subsequent LED elements in the chain, as each finished LED element securely captures liquid epoxy within the internal cavity.

Figure 11A:
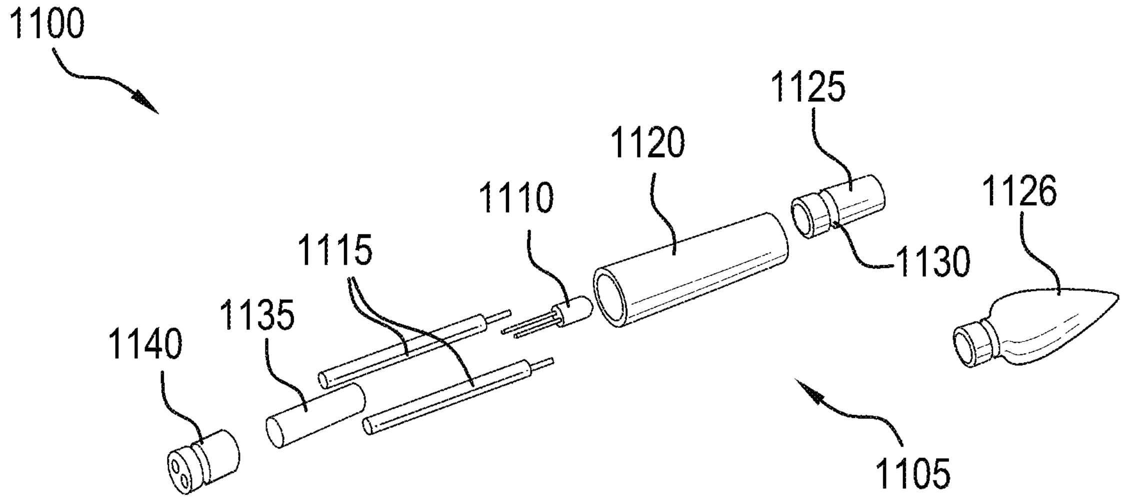
FIGS. 11A and 11B depict an exemplary exploded lighting element which uses a sealing element assembled in a solid form.
Figure 11B:
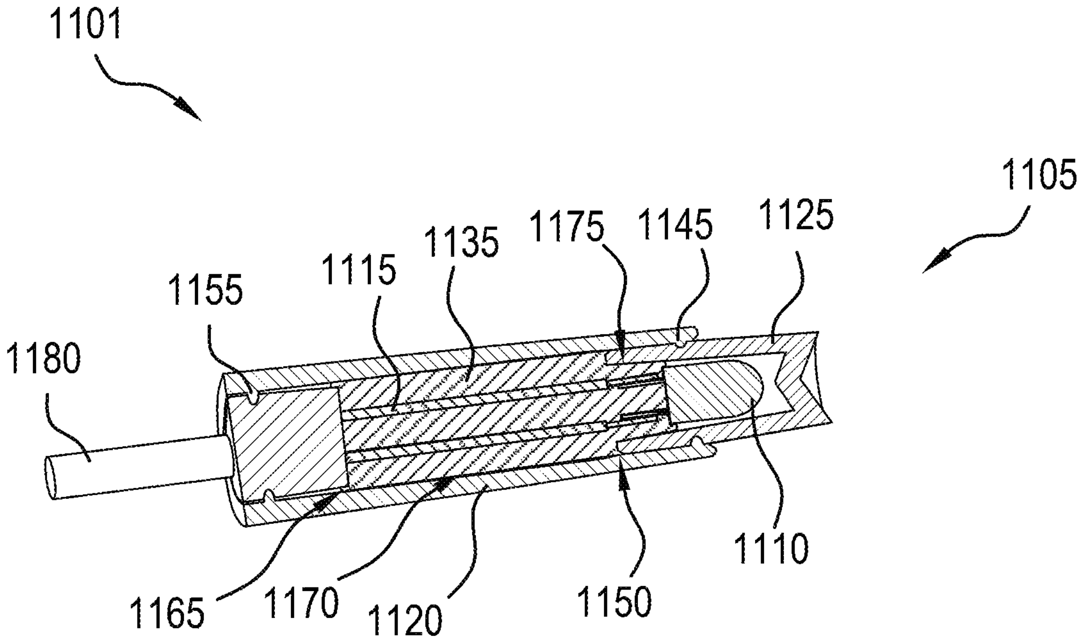

FIGS. 11A and 11B depict an exemplary exploded lighting element which uses a sealing element assembled in a solid form. In the FIGS. 11A and 11B embodiment, an exemplary exploded light string element 1100 includes a lightholder 1105 configured to receive an LED 1110 which is attached to two lead wires 1115. The LED 1110 and the lead wires 1115 may be inserted into the lightholder 1105 during assembly. The lightholder 1105 is depicted as having a lampholder 1120 (e.g., a 'husk') and a lens cap 1125. As depicted, the lens cap 1125 includes a circumferential groove 1130 for providing assembly location with a complementary circumferential feature within the lampholder 1120. The circumferential groove 1130 may, for example, releasably couple the lens cap 1125 to the lampholder 1120 along a longitudinal axis.

The assembled lampholder 1120 and lens cap 1125 combination are depicted as receiving a sealing element 1135. As depicted, the sealing element 1135 is disposed into the lampholder 1120 (e.g., during assembly). In the depicted example, a base plug 1140 is assembled into the lampholder 1120. The base plug 1140 includes two lumens through the base plug 1140. For example, the two lead wires 1115 may be inserted through the two lumens. The base plug 1140 is provided, as depicted, with a circumferential groove 1141. The circumferential groove 1141 may, for example, engage a corresponding (circumferential) ridge on an interior surface of the lampholder 1120. Accordingly, the base plug 1140 may be (releasably) coupled to the lampholder 1120.

FIG. 11B depicts an exemplary cross-section view of the light string element 1100 in an assembled state. During assembly, the lens cap 1125 may be assembled (in)to the lampholder 1120. The circumferential groove 1130 is depicted as engaging a circumferential ridge 1145 of the lampholder 1120. The circumferential groove 1130 and the circumferential ridge may matingly engage such that the lens cap 1125 is releasably coupled to the lampholder 1120. A junction 1150 is thereby formed between the lens cap 1125 and the lampholder 1120.

During assembly, the two lead wires 1115 may be inserted through the lumens of the base plug 1140. In some embodiments the lumens in the base plug 1140 may, for example, be open along a longitudinal axis (e.g., such as disclosed at least with reference to plug 1030 of FIGS. 10A-10B) to form open channels. The lumens may, for example, be configured as longitudinally extending channels in the base plug 1140 having, for example, a semi-circular cross-section. Such embodiments may, for example, permit the two lead wires 1115 to be assembled along a radial axis of the base plug 1140 into the corresponding channel(s) of the base plug 1140.

The two lead wires 1115 may be assembled in electrical connection (e.g., soldered) with respective connection elements of the LED 1110. The sealing element 1135, the LED 1110, the two lead wires 1115, and the base plug 1140 may be assembled (e.g., axially inserted along a longitudinal axis) into the lampholder 1120. The circumferential groove 1141 engages a corresponding (circumferential) ridge 1155 of the lampholder 1120. When matingly engaged, the circumferential groove 1141 and the ridge 1155 may releasably couple the base plug 1140 to the lampholder 1120. A junction 1165 is formed between the base plug 1140 and the lampholder 1120.

The base plug 1140 may assemble into the lampholder 1120 with a loose fit (e.g., manually slidable with minimal force). As depicted, the base plug 1140 is smaller than the interior of the lampholder 1120 such that a visible gap exists between the lampholder 1120 and the base plug 1140 along at least a portion of the length of the base plug 1140.

The sealing element 1135 may, for example, be in a thermodynamically solid phase during assembly. For example, the sealing element 1135 may be in a solid phase at room temperature. The sealing element 1135 may include, by way of example and not limitation, thermoset polymer(s). The sealing element 1135 may include, for example, thermoplastic polymer(s). The sealing element 1135 may, for example, at least partially transition to a thermodynamically liquid phase at at least one (predetermined) thermal criterion.

The at least one thermal criterion may, for example, include a minimum temperature (e.g., surface temperature, internal temperature). The at least one thermal criterion may, for example, include a time period (e.g., minimum time subjected to a minimum temperature). One or more thermal criteria may be determined as a function of attributes of the sealing element 1135. For example, the thermal criteria may be a function of geometry (e.g., diameter, thickness, density, volume, mass). The thermal criteria may, for example, be a function of an assembly (e.g., the light string element 1100), such as, by way of example and not limitation, material, thermal resistance, geometry, thermal properties (e.g., glass transition temperature) or some combination thereof. In various embodiments the at least one thermal criterion may be determined as a function of a glass transition temperature of the sealing element 1135.

When the sealing element 1135 transitions to an at least partially liquid phase, the sealing element 1135 may be distributed along one or more junctions between various components of the lightholder 1105. For example, the sealing element 1135 may flow along one or more seams. The sealing element 1135 may, for example, flow into one or more cavities. As depicted in FIG. 11B, the sealing element 1135 has been transitioned at least partially into a liquid state such that the sealing element 1135 is distributed in the interior of the lampholder 1120. Accordingly, the sealing element 1135 is distributed along the junction 1150. The sealing element 1135 is distributed along the junction 1165. As depicted, the sealing element 1135 is distributed at least partially between the base plug 1140 and the lampholder 1120. A depth of penetration into a joint may, by way of example and not limitation, depend on the size of the joint (e.g., a cross-sectional area exposed to the sealant element), viscosity of the sealant element, temperature of the sealant element, or some combination thereof.

As depicted, the sealing element 1135 is further distributed such that the sealing element 1135 creates a (water-resistant) seal 1170 to an interior surface of the lampholder 1120. In the depicted example, the sealing element 1135 is further distributed such that the sealing element 1135 creates a (water-resistant) seal 1175 to an interior surface of the lens cap 1125. Accordingly, the sealing element 1135 may form a (continuous) water resistant seal between the lens cap 1125, the lampholder 1120, and the base plug 1140.

The sealing element 1135 may, for example, further create a water-resistant seal between the two lead wires 1115 and the base plug 1140 (as depicted). In the depicted example, the sealing element 1135 extends to a base of the LED 1110 such that connection elements of the LED 1110 are substantially entirely encompassed by the sealing element 1135. For example, as depicted, the electrical connections between the two lead wires 1115 and the LED 1110 are entirely encompassed by the sealing element 1135. Accordingly, such embodiments may advantageously form a water-resistant structure encompassing the electrical connection(s) such that water is excluded from the electrical connection(s). In some embodiments the base of the LED 1110 may, for example, not be reached by the sealing element 1135.

In some embodiments the sealing element may only be distributed in a proximal region of the 1120. For example, the sealing element 1135 may seal the lampholder 1120 and the base plug 1140, and/or the base plug 1140 and the two lead wires 1115. The sealing element 1135 may, for example, not seal the lampholder 1120 to the lens cap 1125.

Accordingly, various embodiments may advantageously provide a (self-)distributed sealing agent(s) (e.g., the sealing element 1135). Various embodiments may, for example, advantageously permit loose fits between components due to the sealing agent. Such embodiments may, for example, advantageously enable more rapid and/or less precise assembly (e.g., manual, automatic) of components (e.g., lens cap 1125, lampholder 1120, base plug 1140, two lead wires 1115, LED 1110). Dimensions and tolerancing may, for example, be advantageously configured to permit (non-compressive) sliding fits between two or more components. The sealing agent(s) may advantageously form a seal between loose sliding fits. The sealing agent and/or the joints may be configured to prevent sealant from escaping a cavity (e.g., due to viscosity, geometry). Accordingly, various embodiments may achieve advantages in reduced cost and/or time of manufacturing.

In various embodiments the sealing element 1135 may, for example, be transitioned from a solid state to an at least partially liquid state by application of heat. For example, a heat source may be applied to the sealing element 1135 directly (e.g., an inserted heating element). A heat source may, for example, be applied to the sealing element 1135 indirectly (e.g., through another component(s) of the light string element 1100 (such as, for example, the lampholder 1120). The heat source may, for example, be controlled according to a (predetermined) thermal profile. The thermal profile may, for example, define one or more thermal criteria (e.g., time, temperature).

In various embodiments an adhesive sealant agent may be injected into an internal cavity of the lighting housing. The sealant may substantially surround the LED and provide water resistance to the assembly. The base plug 1140 may contain the sealant while the sealant is curing or drying. The complete assembly may, for example, be transported or moved during assembly even before the sealant is fully cured or set up.

In various embodiments the sealing element 1135 may, by way of example and not limitation, be assembled in an at least partially thermodynamically liquid phase. For example, the sealing element 1135 may be injected into the 1120. The sealing element 1135 may, for example, be injected before assembly of the base plug 1140. The sealing element 1135 may, for example, be injected through the base plug 1140. The sealing element 1135 may, for example, include at least two components which induce a phase transition (e.g., to a thermodynamically solid phase) upon mixing (e.g., epoxy). The phase transition may, for example, occur over a (predetermined) period of time. The components may be selected (e.g., chemistry, ratios) such that the (predetermined) period of time is sufficient for an assembly process.

The two lead wires 1115, as depicted, are disposed within a jacket 1180. The jacket 1180 may, for example, butt up against the base plug 1140. In some embodiments the jacket 1180 may, for example, extend at least partially up into the base plug. In some embodiments the jacket 1180 may be omitted.

In some embodiments the base plug 1140 and the lampholder 1120 may, for example, be configured such that radial compression is induced upon assembly together. In some embodiments a base plug may at least partially assemble over the lampholder 1120. In some embodiments a base plug may assembly over and into the lampholder 1120 (e.g., having an annular cavity configured to receive a proximal end of the lampholder 1120). In some embodiments the lampholder 1120 may, for example, threadingly couple (into, onto) the base plug.

In some embodiments, for example, various components may omit one or more coupling features (e.g., ridge 1155, circumferential groove 1141, circumferential ridge 1145, and/or circumferential groove 1130). Accordingly, some such embodiments may advantageously enable manufacturing cost reductions (e.g., simpler geometry) and/or assembly cost reductions (e.g., less time to assemble). For example, in some embodiments no radial compression may be introduced during assembly.

In some embodiments the lens cap 1125 may, by way of example and not limitation, be omitted (e.g., as disclosed at least with reference to FIG. 8A). In various embodiments the lens cap 1125 may, for example, be configured with various desired shapes and/or geometries. For example, in some embodiments a distal end of the lens cap 1125 may, for example, be configured as depicted by the lens 1020 at least with reference to FIGS. 10A-10B. In some embodiments a distal end of the lens cap 1125 may, for example, be at least partially open. In some embodiments the lens cap 1125 may, for example, be configured with a vintage "Edison-style" appearance.

Figure 12A:
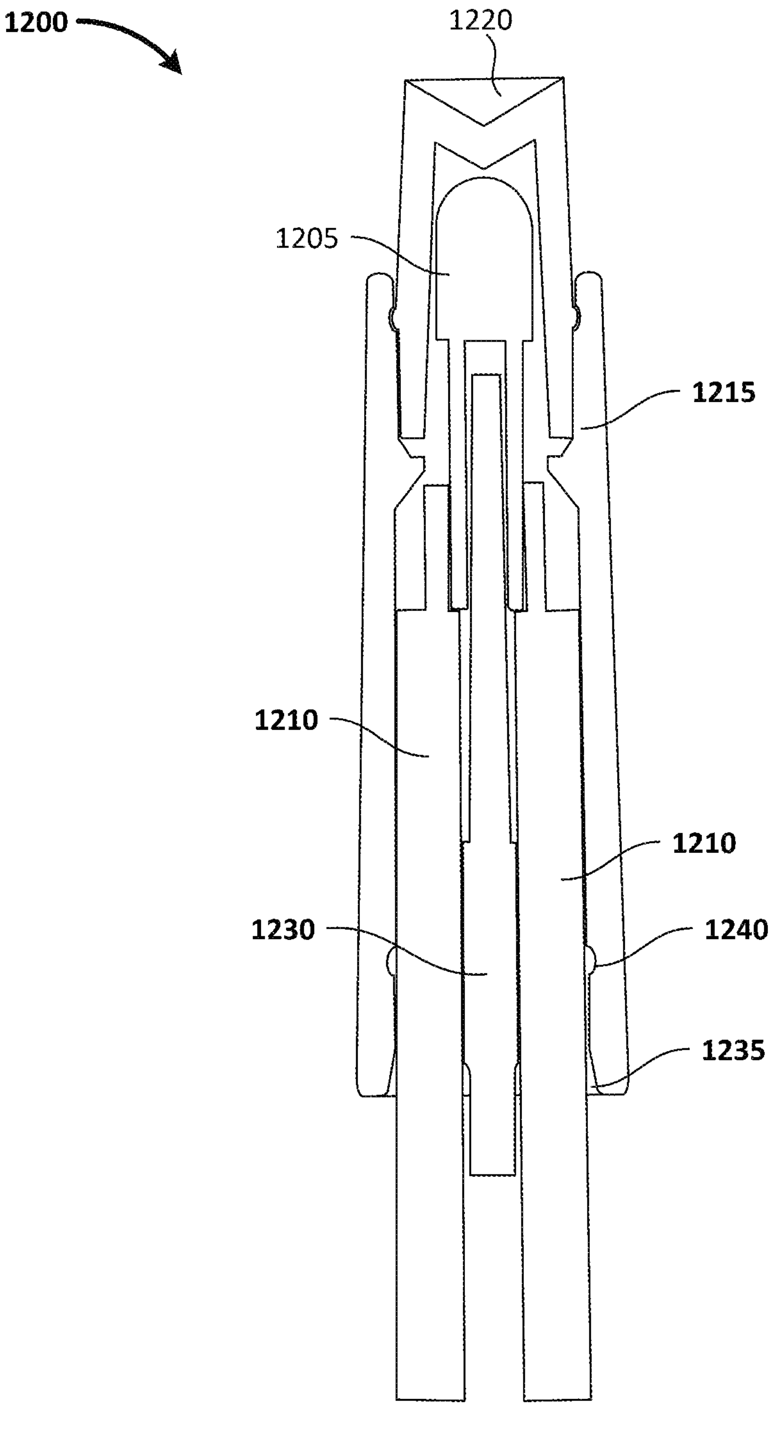
FIGS. 12A and 12B depict cross-section views of an exemplary lighting element which uses a sealing element.
Figure 12B:
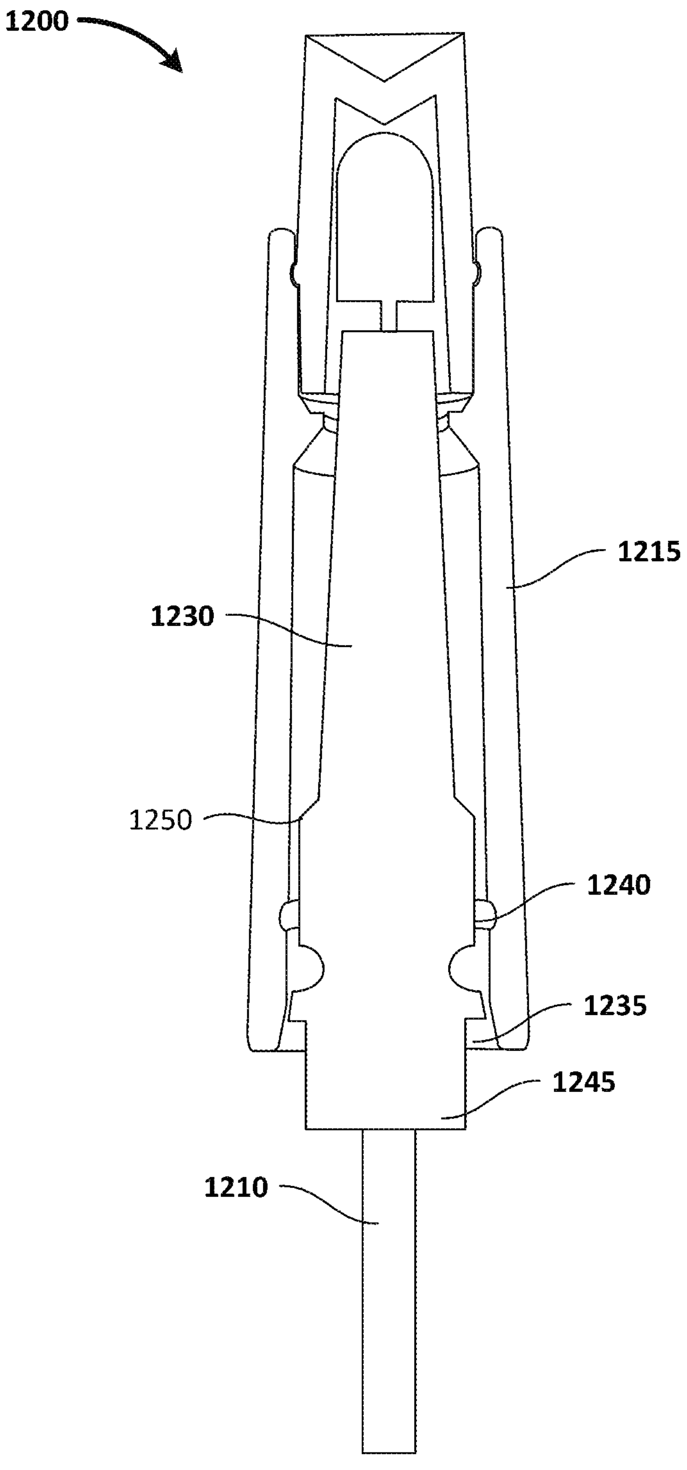

FIGS. 12A and 12B depict cross-section views of an exemplary lighting element 1200 which uses a sealing element. In this example, the lighting element 1200 includes an LED 1205 which is attached to two lead wires 1210. For example, the LED 1205 and the lead wires 1210 may be inserted into a light enclosure during assembly of the lighting element 1200. The light enclosure, in this example, includes a lampholder 1215 and a lens 1220. In some implementations, the assembled lampholder 1215 and the lens 1220 combination may receive an injection of a sealing agent. The LED 1205 and lead wires 1210 may be inserted into the assembly. For example, the lighting enclosure may receive an epoxy in liquid phase. In some examples, the sealing agent may include glue. In some examples, the sealing agent may include UV-cured polymer. An insert component 1230 is inserted after the light enclosure receives the injection of the sealing agent to, for example, provide a sealing fit between the lead wires 1210 and the lampholder 1215.

During assembly, for example, the insertion of the insert component 1230 may cause at least some of the injected sealing agent to become excess and may be pushed out of position (e.g., by the insert component 1230 and/or the lead wires 1210). In this example, the lighting element 1200 includes a base reservoir 1235 to hold the excess sealing agent. In various embodiments, the base reservoir 1235 may advantageously reduce leakage into the lead wires 1210 and out of the lampholder 1215. For example, in an automated assembly process, a machine may be used to insert the insert component 1230 into the light enclosure. The base reservoir 1235 may advantageously prevent the excess sealing agent to be attached to the machine. In some examples, machine efficiency may be degraded by the attachment of the sealing agent.

In the depicted example, the lampholder 1215 includes an internal reservoir 1240. In some examples, the internal reservoir 1240 may receive part of the excess sealing agent to form a seal against the lampholder 1215 when the insert component 1230 is being inserted into the light enclosure.

As shown in FIG. 12B, the insert component 1230 includes an insert component base 1245. In some implementations, the insert component base 1245 may extend beyond the lampholder 1215. In various embodiments, an automated machine may use the insert component base 1245 to position the insert component 1230. For example, the automated machine may hold the insert component 1230 to insert the insert component 1230 into the lampholder 1215. In some examples, the automated machine may substantially avoid most of the excess sealing agent flowing out of a base the lampholder 1215 during insertion. For example, the automated machine arm may hold the insert component base 1245 without touching the base of the lampholder 1215. For example, the excess sealing agent may not reach the automated machine arm.

In this example, the lampholder 1215 further includes a baffle 1250 for directing the excess sealing agent towards the base reservoir 1235. In some embodiments, the baffle 1250 may advantageously reduce a pressure of the lampholder 1215 during an insertion of the insert component 1230 and reduce an amount of the excess sealing agent flowing out of the lighting element 1200.

Figure 13:
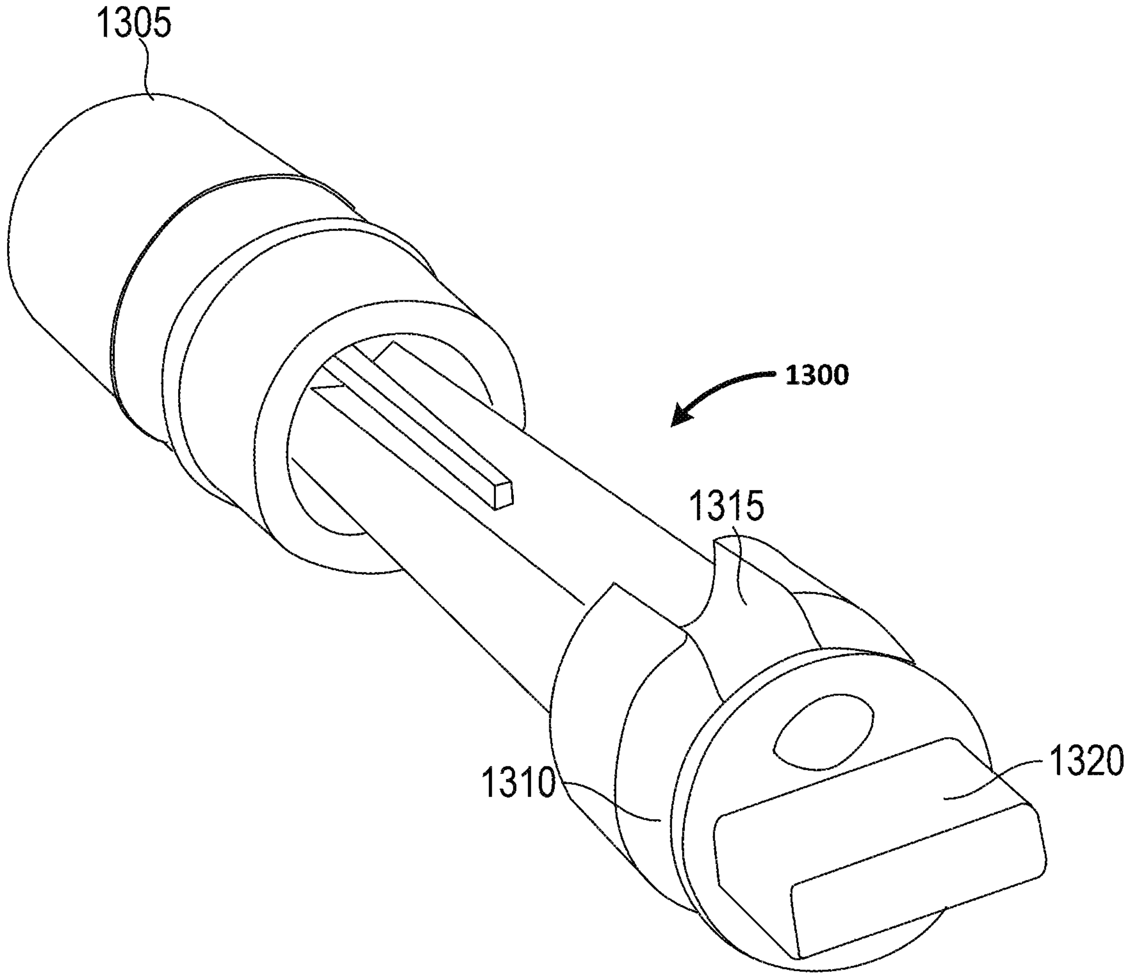
FIG. 13 depicts an exemplary insert component for an exemplary lighting element which uses an injected sealing agent.

FIG. 13 depicts an exemplary insert component 1300 for an exemplary lighting element which uses an injected sealing agent. In this example, the insert component 1300 is inserting into a lampholder 1305. For example, the lampholder 1305 may be filled with epoxy and/or other sealing agents. The insert component 1300 includes a base reservoir 1310 and a baffle 1315. In some examples, the base reservoir 1310 and the baffle may hold an excess sealing agent during insertion of the insert component 1300.

As shown in FIG. 13, the base reservoir 1310 is a ring-shaped cavity for holding the excess sealing agent. In some implementations, other shapes of the base reservoir 1310 may be provided. For example, the base reservoir 1310 may include one or more pockets distributed along a base of the insert component 1300. In this example, the baffle 1315 is interconnected with the base reservoir 1310. For example, the connection between the base reservoir 1310 and the baffle 1315 may advantageously facilitate the flow of the excess sealing agent into the base reservoir 1310 and reduce the amount of the sealing agent flowing out of the lampholder 1305.

The insert component 1300 includes an insert component base 1320. In various embodiments, the insert component base 1320 may extend beyond the base of the lampholder 1305 to form a tab. In this example, the insert component base 1320 may be configured to be releasably coupled to an automated machine. For example, an robotic arm of the automated machine may couple with (e.g., grip) the insert component base 1320. The automated machine may, for example, position the insert component 1300 into the lampholder 1305. In some implementations, the extension of the insert component base 1320 from the base of the lampholder 1305 may advantageously prevent the automated machine arm to be spoiled with the excess sealing agent.

Figure 14:
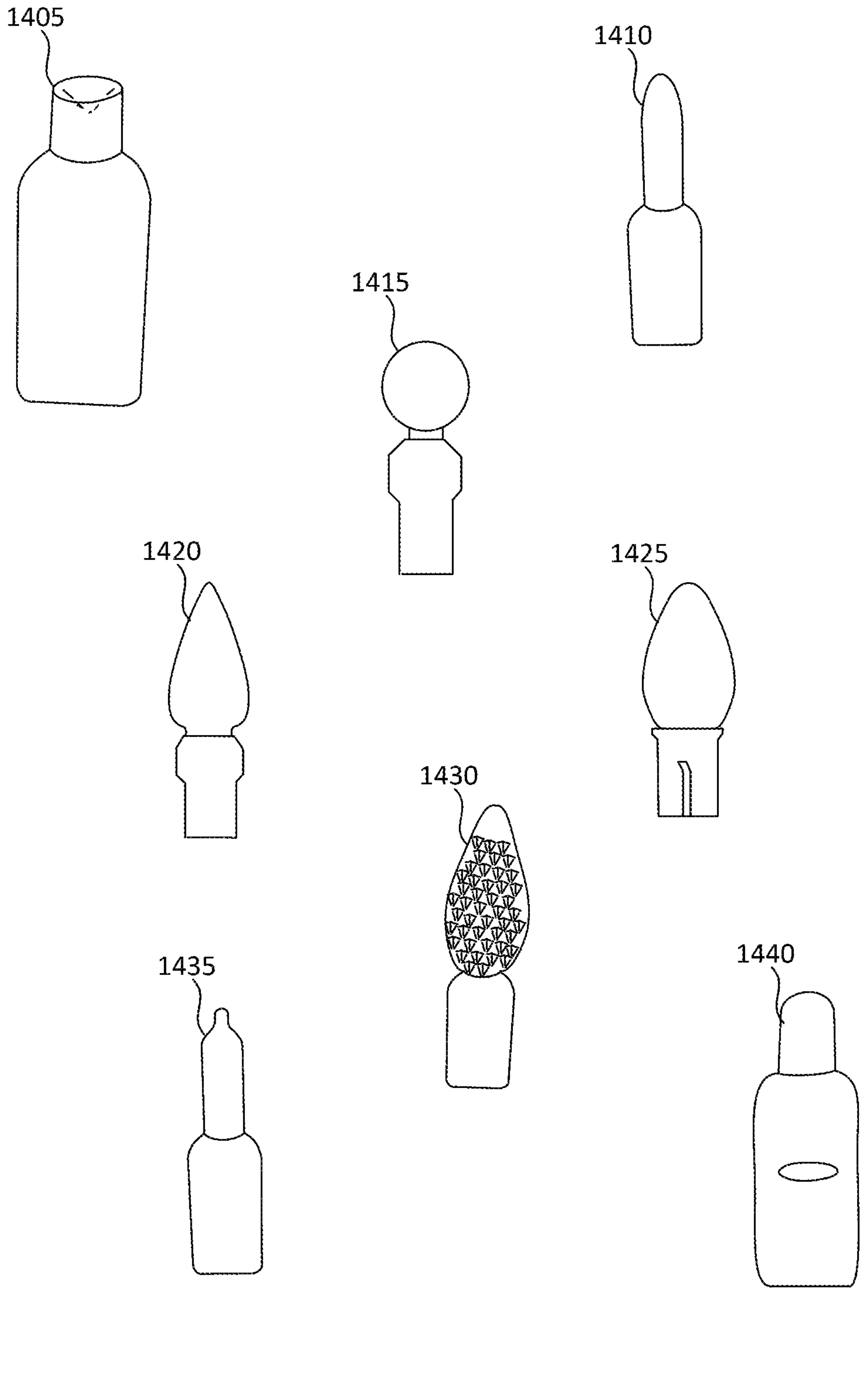
FIG. 14 depicts exemplary lens caps for various lighting elements as described in FIGS. 1-13.

FIG. 14 depicts a plurality of exemplary lens caps for various lighting elements as described in FIGS. 1-13. In this example, a 5MM lens cap 1405 may be used, for example, with FIG. 10B. In some embodiments, the 5MM lens cap 1405 may be used as the lens 1020 as described in FIG. 10B.

Figure 2D:
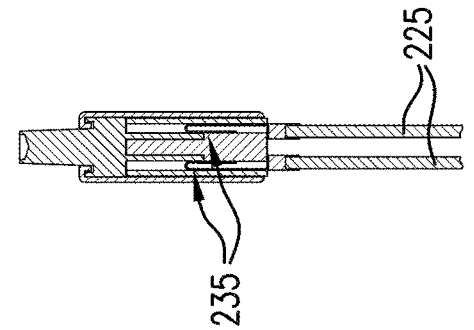
FIGS. 2A, 2B, 2C, and 2D depict exploded views of an exemplary lighting element without integrally molded leads.
Figure 2C:
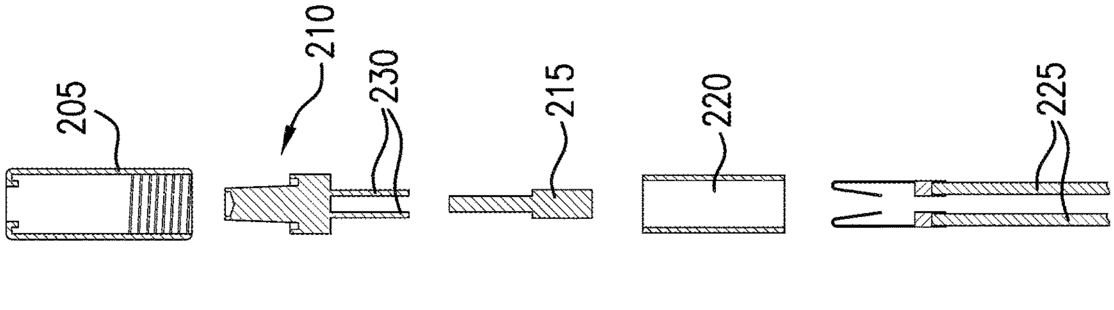
Figure 2B:
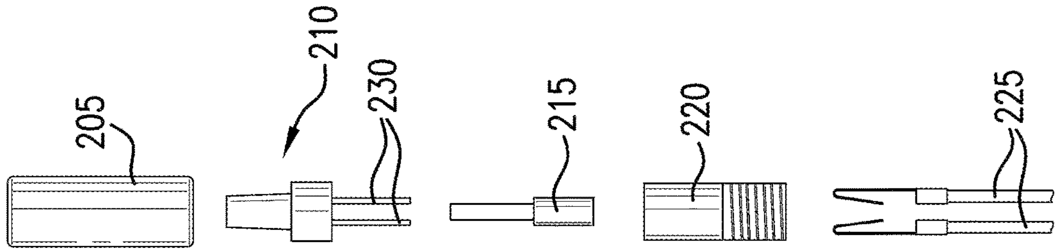
Figure 2A:
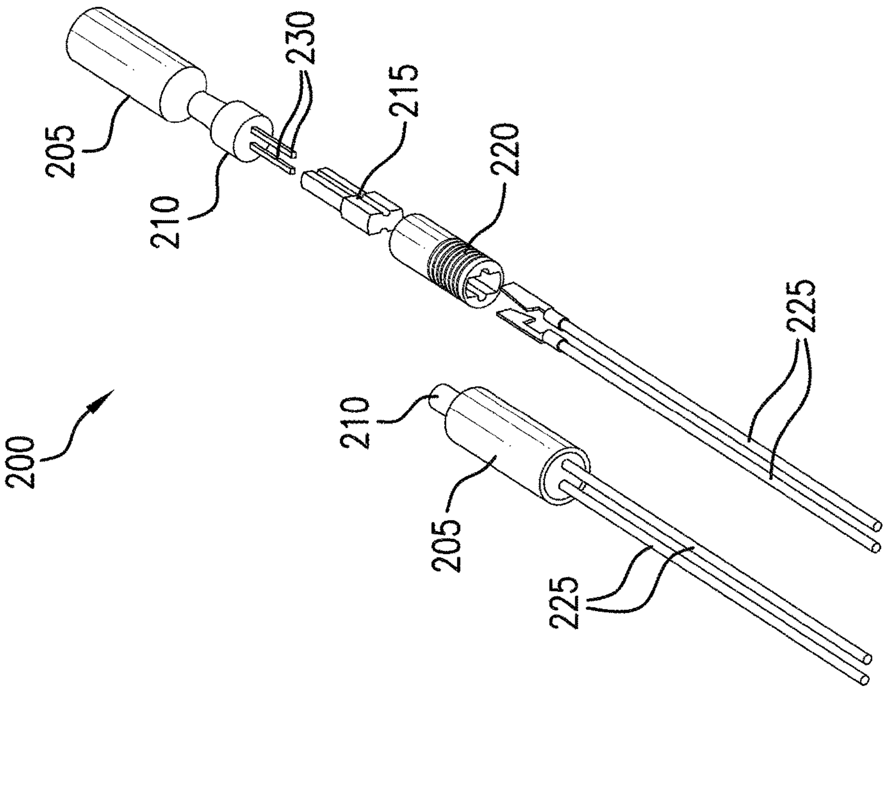

In some embodiments, an M5 lens cap 1410 may be configured as a lens cap, such as, for example, as disclosed at least with reference to the cap 205 in FIG. 2A. In some embodiments, a G12 lens cap 1415 may be configured as a lens cap, such as, for example, as disclosed at least with reference to the LED cap 505 in FIG. 5A. In some embodiments, a C6 lens cap 1420 may be configured as a lens cap, such as, for example, as disclosed at least with reference to the cap 705 in FIG. 7A. In some embodiments, a C7 lens cap 1425 may be configured as a lens cap, such as, for example, as disclosed at least with reference to the cap 705 in FIG. 7A.

In this example, a C9 lens cap 1430 may be used, for example, with FIG. 12A. As depicted, the lens cap 1430 has a three-dimensional tetrahedral pattern. In some embodiments, other patterns may be provided. Various embodiments may provide a tetrahedral and/or other (three-dimensional) pattern on at least some portion of the various lens caps. In some embodiments no pattern may be provided (e.g., the lens cap may have a substantially continuous and smooth surface). In some embodiments, the lens cap 1430 may be used as the lens 1220 as described in FIG. 12A.

In some embodiments, a tear drop lens cap 1435 may be configured as a lens cap, such as, for example, as disclosed at least with reference to the lens cap 1125 in FIG. 11. In this example, a lens cap 1440 may be used, for example, with FIG. 1. In some embodiments, the lens cap 1440 may be used as the LED cap 105 as described in FIG. 1.

In some embodiments, a lens cap (e.g., 1405-1440) may be configured as a lens cap, such as, for example, as disclosed at least with reference to the clear cap 910 in FIG. 9. In some embodiments, a clear lens cap (e.g., 1405-1440) may be configured as a lens cap, such as, for example, as disclosed at least with reference to the lens 1020 in FIG. 10. Exemplary caps may, for example, be provided on various embodiments. The exemplary applications described with relation to the lens caps 1405-1440 are given by way of example and not limitation.

In some embodiments, a lens cap may be configured as a closed-end lens cap. For example, the lampholder 1015 as described with reference to FIG. 10A may be combined with the lens 1020 to be a closed-end lens cap. For example, the combined closed-end lens cap may include one opening for insertion of the assembled light string element 1000. For example, the lampholder 1015 may be manufactured in closed ended design such as with the lens 1020 preassembled into the lampholder 1015 to form an one-piece object.

Various embodiments of a closed-end lens cap may be possible. For example, the cap 705 as described with reference to FIG. 7A may be a closed-end cap. For example, the LED cap 505 as described with reference to FIG. 5B may also be configured as a closed-end cap. For example, the cap 205 as described with reference to FIG. 2C may also be configured as a closed-end cap. For example, the cap 105 as described with reference to FIG. 1 may also be configured as a closed-end cap without the aperture 150.

Although various embodiments have been described with reference to the Figures, other embodiments are possible. For example, in some embodiments the base may include two sandwich pieces. In an exemplary embodiment, the base may include a single piece with a split to permit the insertion of wires. In some embodiments, the base may be of clamshell construction. In some embodiments, the wires may be completely circumscribed by the base element. In some embodiments, the wires may be pressed between the base element and a cap element. In some embodiments, a moat/rib structure may provide connection between the base and the cap elements. In an exemplary embodiment, a double moat/rib structure may provide connection. Some embodiments may have three or more moat/rib structures. In some embodiments, an array of parallel moats may circumscribe a member. The two members may be pressed together until the captured LED "bottoms out." When the captured LED is tightly contained, whatever moat/rib interfaces that are used may provide the connection/seal of the members. For example, a certain lot of LEDs may be modestly longer than the typical lot. Thus, when connected, the rings of moats that interface the rib rings may be one or more ring pitch locations different from the typical build. The resulting ring/moat interface may still provide a good water resistant seal.

Some embodiments may, for example, interchange a (mating) ridge and groove with respect to a depicted example. Various exemplary embodiments may interchange at least one corresponding ridge and groove of the embodiment depicted in FIGS. 11A and 11B. For example, the circumferential groove 1130 may be applied to the lampholder 1120. The circumferential ridge 1145 may, for example, be applied to the lens cap 1125. The circumferential groove 1141 may, for example, be applied to the lampholder 1120. The ridge 1155 may, for example, be applied to the base plug 1140. The lens cap 1125 may, for example, fit over the lampholder 1120.

In various embodiments a fixing structure (e.g., ridge, groove) may be applied to another surface. As an exemplary illustration, the ridge 1155 may, for example, be applied to an exterior surface of the lampholder 1120. The base plug 1140 may fit over the lampholder 1120. The circumferential groove 1141 may be configured to engage the ridge 1155 on the exterior surface of the lampholder 1120.

In an exemplary embodiment, more than two wires may be compressed each within a deformable wiring aperture. In some embodiments, the cap may be electrically conductive and may carry current along with one or more wires. For example, some embodiments may have 1, 2, 3, 5, 8 . . . or more, such as any practical number of wire apertures, for example.

In various embodiments, different types of electro-magnetic devices may be captured within a capture device. For example, in some embodiments the electro-magnetic device may be a transducer or a sensor. In one exemplary embodiment, a magnetic sensor may be captured within the capture device. In some embodiments, the cap may have a magnetic permeability greater than one. In some embodiments, the cap may have a high dielectric coefficient, for example. In various embodiments the cap may have a transparent portion. In some embodiments the cap may have a colored translucent portion, for example.

In an exemplary embodiment, a water-resistant capture device for enclosing a wired electro-magnetic component may include a base module. In some embodiments, the capture device may include a cap module that is configured to connect to the base module. The base module may have two connected halves being defined by a split. The split may permit the wire apertures to be opened so as to permit the introduction of a wire, without having to cut the wire. In some embodiments, the wire apertures may be split into two substantially equal halves. The wire apertures of the base module may be compressed when the base module is connected to the cap module. This wire-aperture compression may be configured to compress a wire having a predetermined diameter when introduced into the wire aperture. When the base module is connected to the cap module, an interior cavity may be sized to accommodate an electro-magnetic component of a predetermined size and geometry. In some embodiments, a device aperture in the cap module may provide an enclosed electro-magnetic component fluid communication with the ambient. In some embodiments, the aperture may have a deformable sealing surface against which the component is compressed when the cap module is attached to the base module.

In some embodiments, a lens cap 1126 may be assembled to the lampholder 1120. The lens cap 1126 may, for example, be configured as a C6 style cap. Such embodiments may, for example, provide a desired aesthetic configuration, such as in place of a light string element using the lens cap 1125. As depicted, the lens cap 1126 includes a circumferential groove, which may be configured such as disclosed with reference to the circumferential groove 1130 of the lens cap 1125.

In some embodiments, an exterior lens may be attached over the LED lamp. For example, in some embodiments, the LED cover may have a lens connector to which a lens may be affixed. In some embodiments a C6 type lens may substantially surround an illuminated portion of an LED, for example. In some embodiments other lens sizes and/or designs may be attached to a light string. In some embodiments, the exterior lenses may be replaceably attached to the LED assemblies. In an exemplary embodiment a C9 type lens may be attached. The replaceable lenses may permit an end user of a light string to select the color and/or shape and/or size of the exterior lens, for example. In some embodiments, the lens may attach in an attachment aperture that is slightly undersized so as to provide a watertight seal. Various embodiments may attach the exterior lens using a variety of couplers. For example, an exterior lens may be threaded and secured to a lamp assembly by screwing it to threads manufactured on the assembly. In some embodiments, the LED may be secured in the husk in a water resistant manner. In such embodiments, the exterior lamp may not use a water resistant coupler. In some embodiments, however, the lamp may be coupled in a water resistant manner providing a second barrier to water.

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are compressed within deformable wire apertures formed by the combined base module and cap module. In some embodiments, the base module is deformable and deforms when affixed to the cap module so as to provide compressive a water-resistant seal to an interior of the capture device. In an exemplary embodiment, an LED may be captured within the capture device. The cap module may provide a compressing aperture to provide a water resistant seal around the lens of an LED projecting without the capture device.

In an exemplary embodiment, a water-resistant LED capture device may include a base module and a cap module. The cap module may be configured to assemble to the base module. In some embodiments, an internal cavity may be formed by the cap module and the base module when the cap module is assembled to the base module. The internal cavity may be configured to receive a light-emitting device therein. In some embodiments, the cap module may provide light transmissivity from a received light-emitting device to an outside of the water-resistant LED capture device.

Various embodiments may include a deformable sealing member that deforms as the cap module is assembled to the base module. In some embodiments, when the cap module is assembled to the base module and the deformable sealing member is deformed, the deformable sealing member may form a water resistant seal between the cap module and the base module along a substantially annular path.

In some embodiments, an assembly comprising the cap module and the base module may include two lumens. Each lumen may be configured to provide a pathway for an insulated conductor from the outside of the water-resistant LED capture device to the internal cavity to supply electrical energy to a light-emitting device therein.

Assembling the cap module to the base module may introduce a radial compression that reduces the mean cross-sectional area of each of the two lumens to form a water-resistant seal circumscribing each of the insulated conductors in the corresponding two lumens. In some embodiments, the lumens may have a reduced cross section at one or more locations along a longitudinal dimension of the lumen. In some embodiments, the mean cross-sectional area may be defined as the average cross-sectional area along a longitudinal dimension perpendicular to the cross-section. In some embodiments, the lumens may have a conical geometry, for example. In some embodiments, the lumens may have a substantially cylindrical geometry.

Various embodiments present various means for sealing a cap module to a base module. Some embodiments provide a water-resistant seal using an epoxy. In some embodiments, a compressible sealing member may compress between a cap module and a base module. In some embodiments a cap module may be deformable. A deformable cap module may expand when coupled to a base module. The expanded cap module may tightly engage the base module providing a water-resistant coupling. In some embodiments a raised annular ridge my couple to an annular depression of the complementary member, for example. In some embodiments a plurality of coupling features may present a series or water-resistive barriers.

In an exemplary aspect, a water-resistant LED capture device may include a base module. The capture device may include a cap module configured to assemble to the base module. An internal cavity may be formed by the cap module and the base module when the cap module is assembled to the base module, the internal cavity configured to at least partially receive a light-emitting device. The capture device may include a sealant element configured to assemble into the internal cavity in a thermodynamically solid phase. When the cap module is assembled to the base module, the base module may engage a fixing structure of the cap module that couples the base module to the cap module. When the base module is inserted into the cap module, the base module may define at least two lumens extending longitudinally through at least a portion of the base module. Each of the at least two lumens may be configured to provide a pathway for an insulated conductor from an outside of the water-resistant LED capture device to the internal cavity to supply electrical energy to the light-emitting device therein. When heat energy is applied such that the sealant element at least partially transitions into a thermodynamically liquid phase, the sealant element may form a water-resistant seal between the base module and cap module.

In an exemplary aspect, a water-resistant LED capture device may include a base module. The capture device may include a cap module configured to assemble to the base module. An internal cavity may be formed by the cap module and the base module when the cap module is assembled to the base module. The internal cavity may be configured to at least partially receive a light-emitting device. The capture device may include a sealant element configured to be disposed into the internal cavity. When the base module is inserted into the cap module, the base module may define at least one lumen extending longitudinally along at least the base module, the at least one lumen configured to provide a pathway for an insulated conductor from an outside of the water-resistant LED capture device to the internal cavity to supply electrical energy to the light-emitting device therein. When the sealant element is at least partially in a thermodynamically liquid phase, at least a portion of the sealant element may be distributed along at least one junction between the base module and the cap module such that, when the sealant element subsequently transitions to a thermodynamically solid phase, the sealant element may form a water-resistant seal between the base module and the cap module.

The sealant element may be configured to be disposed into the internal cavity in a thermodynamically solid phase. The sealant element may further be configured to be transitioned from the thermodynamically solid phase at least partially into the thermodynamically liquid phase when heat energy is applied until the sealant element reaches at least one predetermined thermal criterion.

The sealant element may be configured to be disposed into the internal cavity in a thermodynamically liquid phase.

The sealant element may be configured to transition from the thermodynamically liquid phase to the thermodynamically solid phase in response to a change in thermal energy of the sealant element.

The sealant element may include at least two fluid components. The sealant element may be configured to transition from the thermodynamically liquid phase to the thermodynamically solid phase in response to a chemical reaction initiated by mixture of the least two components.

The base module may be deformable. The cap module may be deformable.

When the cap module is assembled to the base module, one of the cap module and the base module may engage a fixing structure of another of the cap module and base module such that the cap module is coupled to the base module.

The fixing structure may include at least one of a circumferential ridge and a circumferential groove in a surface of the one of the cap module and the base module. The other of the cap module and the base module may include the other of a circumferential ridge and a circumferential groove. The circumferential groove may be configured to receive the circumferential ridge when the cap module is assembled to the base module.

The base module may include threads and the fixing structure of the cap module may include complementary threads configured to mate with the threads of the base module.

When the light-emitting device is received in the cavity and the cap module is assembled to the base module, the base module may engage a base of the light-emitting device and force the light-emitting device against an annular water-sealing surface of the cap module.

The at least one lumen may include two lumens extending longitudinally through at least a portion of the base module. Each of the at least two lumens may be configured to provide a pathway for a separate insulated conductor from the outside of the water-resistant LED capture device to the internal cavity to supply electrical energy to the light-emitting device therein.

The sealant element may be further distributed around the at least one lumen such that a water-resistant seal is formed at least between the at least one lumen and the base module.

The sealant element may substantially entirely encompass an electrical connection between the insulated conductor and the light-emitting device, including an entire exposed portion of a conductive element of the insulated conductor.

Assembly of the base module to the cap module may introduce radial compression that provides a water-resistant seal between the base module and the cap module.

The base module may be configured to split at least partially along a plane that is substantially coplanar with an axis of each of the two lumens.

The cap module may have an aperture through which a lens of the light-emitting device projects when the light-emitting device is received in the internal cavity and the cap module is assembled to the base module.

The cap module may be a first cap module. The water-resistant LED capture device may further include a second cap module. The second cap module may be at least partially optically translucent and configured to assemble to the first cap module such that light emitted from the light-emitting device is visible external to the internal cavity through the second cap module.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A water-resistant LED device comprising:

a light enclosure comprising:

a base module extending along a longitudinal axis comprising a tab extending distally from the base module; and, a cap module configured to assemble to the base module, wherein an internal cavity parallel to the longitudinal axis is formed from a proximal end of the cap module towards a distal end of the base module when the cap module is assembled to the base module, the internal cavity configured to at least partially receive a light-emitting device; and, a sealant element configured to be disposed in the internal cavity;

wherein:

at least when the base module is assembled to the cap module, the base module defines at least one lumen extending longitudinally along at least the base module, the at least one lumen being configured to provide a pathway for a plurality of insulated conductors from an outside of the light enclosure to the internal cavity to supply electrical energy to the light-emitting device therein, and the base module is configured such that, when the base module is assembled to the cap module: while the sealant element is in an at least partially thermodynamically liquid phase, the tab provides a handle extending beyond a distal end of the cap module configured for manipulating the base module without contacting the sealant element, and the sealant element is distributed to form a water-resistant seal between the cap module and a perimeter of the base module proximal to the tab.

2. The water-resistant LED device of claim 1, wherein the at least one lumen comprises two lumens extending longitudinally through at least a portion of the base module, each of the at least two lumens being configured to provide a pathway for a separate insulated conductor from the outside of the light enclosure to the internal cavity to supply electrical energy to the light-emitting device therein.

3. The water-resistant LED device of claim 2, wherein the base module is configured to split at least partially along a plane that is substantially coplanar with an axis of each of the at least two lumens.

4. The water-resistant LED device of claim 3, wherein the base module comprises a hinge, and, the base module is configured to hingedly open and close about the hinge.

5. The water-resistant LED device of claim 1, wherein the cap module comprises:

a closed-end at a distal end of the cap module; and, an aperture at a proximal end of the cap module.

6. The water-resistant LED device of claim 1, wherein when the sealant element is at least partially in a thermodynamically liquid phase, at least a portion of the sealant element is distributed along at least one junction between the base module and the cap module and between and around a plurality of connections of the plurality of insulated conductors with the light-emitting device such that, when the sealant element subsequently transitions to a thermodynamically solid phase, the sealant element forms a water-resistant seal between the base module and the cap module and separating the plurality of connections.

7. The water-resistant LED device of claim 1, wherein:

the sealant element is configured to be disposed into the internal cavity in a thermodynamically solid phase, and, the sealant element is further configured to be transitioned from the thermodynamically solid phase at least partially into the thermodynamically liquid phase when heat energy is applied until the sealant element reaches at least one predetermined thermal criterion.

8. The water-resistant LED device of claim 1, wherein the sealant element is configured to be disposed into the internal cavity in a thermodynamically liquid phase.

9. The water-resistant LED device of claim 1, wherein the sealant element is configured to transition from the thermodynamically liquid phase to a thermodynamically solid phase in response to a change in thermal energy of the sealant element.

10. The water-resistant LED device of claim 1, wherein the sealant element comprises at least two fluid components, and the sealant element is configured to transition from the thermodynamically liquid phase to a thermodynamically solid phase in response to a chemical reaction initiated by mixture of the at least two components.

11. The water-resistant LED device of claim 1, wherein at least one of the base module and the cap module is deformable.

12. The water-resistant LED device of claim 1, wherein when the cap module is assembled to the base module, one of the cap module and the base module engages a fixing structure of another of the cap module and the base module such that the cap module is coupled to the base module.

13. The water-resistant LED device of claim 1, wherein, when the light-emitting device is received in the internal cavity and the cap module is assembled to the base module, the base module engages a base of the light-emitting device and forces the light-emitting device against an annular water-sealing surface of the cap module.

14. The water-resistant LED device of claim 1, wherein the sealant element is further distributed around the at least one lumen such that a water-resistant seal is formed at least between the at least one lumen and the base module.

15. The water-resistant LED device of claim 1, wherein assembly of the base module to the cap module introduces radial compression that provides a water-resistant seal between the base module and the cap module.

16. The water-resistant LED device of claim 1, wherein the cap module has a lens through which the light-emitting device projects when the light-emitting device is received in the internal cavity and the cap module is assembled to the base module.

17. The water-resistant LED device of claim 1, wherein the cap module is a first cap module, and the water-resistant LED device further comprises a second cap module, the second cap module being at least partially optically translucent and configured to assemble to the first cap module such that light emitted from the light-emitting device is visible external to the internal cavity through the second cap module.

18. The water-resistant LED device of claim 1, wherein at least one of the base module and the cap module is further configured such that a fluid reservoir is formed around a peripheral opening through which the cap module and the base module are assembled together to receive at least some of the sealant element such that the sealant element creates the water-resistant seal between the base module and the cap module.

19. A water-resistant LED device comprising: a light enclosure comprising: a base module; and, a cap module configured to assemble to the base module, wherein an internal cavity is formed by the cap module and the base module when the cap module is assembled to the base module, the internal cavity configured to at least partially receive a light-emitting device; and, a sealant element configured to be disposed into the internal cavity; wherein: at least when the base module is assembled to the cap module, the base module defines at least one lumen extending longitudinally along at least the base module, the at least one lumen being configured to provide a pathway for a plurality of insulated conductors from an outside of the light enclosure to the internal cavity to supply electrical energy to the light-emitting device therein, and at least one of the base module and the cap module is configured such that, when the base module is assembled to the cap module: a fluid reservoir is formed around a peripheral opening, through which the cap module and the base module are assembled together, to receive at least some of the sealant element such that the sealant element creates a water-resistant seal between the base module and the cap module along a perimeter region of the base module such that the internal cavity is substantially sealed, and a distal end of the base module extends past the fluid reservoir, wherein the base module further comprises a tab extending distally from the base module such that, when the base module is assembled to the cap module, the tab provides a handle for holding the base module without contacting the sealant element.

* * * * *